(12) United States Patent
Du et al.

(10) Patent No.: US 10,630,884 B2
(45) Date of Patent: Apr. 21, 2020

(54) CAMERA FOCUSING METHOD, APPARATUS, AND DEVICE FOR TERMINAL

(71) Applicant: Huawei Technologies Co., Ltd., Shenzhen (CN)

(72) Inventors: Cheng Du, Beijing (CN); Wei Luo, Shanghai (CN); Xin Guo, Beijing (CN); Huaiyang Rong, Shenzhen (CN); Jin Wu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 23 days.

(21) Appl. No.: 16/087,926

(22) PCT Filed: Mar. 23, 2016

(86) PCT No.: PCT/CN2016/077119
§ 371 (c)(1),
(2) Date: Sep. 24, 2018

(87) PCT Pub. No.: WO2017/161523
PCT Pub. Date: Sep. 28, 2017

(65) Prior Publication Data
US 2019/0320120 A1 Oct. 17, 2019

(51) Int. Cl.
*H04N 5/232* (2006.01)
*G01C 3/08* (2006.01)
(Continued)

(52) U.S. Cl.
CPC ......... *H04N 5/232121* (2018.08); *G01C 3/08* (2013.01); *G01C 3/14* (2013.01);
(Continued)

(58) Field of Classification Search
None
See application file for complete search history.

(56) References Cited

U.S. PATENT DOCUMENTS

| 8,760,567 B2 | 6/2014 | Hamamura |
| 8,792,006 B2 | 7/2014 | Lee |

(Continued)

FOREIGN PATENT DOCUMENTS

| CN | 1616920 A | 5/2005 |
| CN | 201378223 Y | 1/2010 |

(Continued)

OTHER PUBLICATIONS

Machine Translation and Abstract of Chinese Publication No. CN105100605, Nov. 25, 2015, 12 pages.
Foreign Communication From a Counterpart Application, Chinese Application No. 201680009577.6, Chinese Office Action dated May 7, 2019, 6 pages.
(Continued)

*Primary Examiner* — James M Hannett
(74) *Attorney, Agent, or Firm* — Conley Rose, P.C.

(57) ABSTRACT

A camera focusing method, apparatus, and device for a terminal, and relate to the field of electronic device technologies to improve focusing precision of a terminal in a camera focusing process. The method includes obtaining a first confidence and a second confidence, determining a target ranging manner and a target object distance when the first confidence and the second confidence meet a preset condition, and determining a target position in a lens position interval to help a first camera and a second camera complete focusing.

18 Claims, 8 Drawing Sheets

(51) Int. Cl.
*G01C 3/14* (2006.01)
*G02B 7/28* (2006.01)
*H04N 5/225* (2006.01)

(52) U.S. Cl.
CPC ............ *G02B 7/287* (2013.01); *H04N 5/2258* (2013.01); *H04N 5/23293* (2013.01)

(56) References Cited

U.S. PATENT DOCUMENTS

| | | | |
|---|---|---|---|
| 2010/0208091 A1 | 8/2010 | Chang | |
| 2012/0098971 A1* | 4/2012 | Hansen | ............... H04N 5/2258 348/164 |
| 2013/0321587 A1 | 12/2013 | Kim | |
| 2017/0286783 A1 | 10/2017 | Yim et al. | |
| 2018/0031372 A1* | 2/2018 | Gill | ......................... G01C 3/14 |

FOREIGN PATENT DOCUMENTS

| | | |
|---|---|---|
| CN | 102494609 A | 6/2012 |
| CN | 102914262 A | 2/2013 |
| CN | 103292779 A | 9/2013 |
| CN | 104573646 A | 4/2015 |
| CN | 104883502 A | 9/2015 |
| CN | 105100605 A | 11/2015 |
| JP | 2005021453 A | 1/2005 |
| WO | 2014152254 A2 | 9/2014 |
| WO | 2016035955 A1 | 3/2016 |

OTHER PUBLICATIONS

Machine Translation and Abstract of Chinese Publication No. CN1616920, May 18, 2005, 9 pages.
Machine Translation and Abstract of Chinese Publication No. CN102494609, Jun. 13, 2012, 25 pages.
Machine Translation and Abstract of Chinese Publication No. CN102914262, Feb. 6, 2013, 16 pages.
Machine Translation and Abstract of Chinese Publication No. CN103292779, Sep. 11, 2013, 13 pages.
Machine Translation and Abstract of Chinese Publication No. CN104573646, Apr. 29, 2015, 20 pages.
Machine Translation and Abstract of Chinese Publication No. CN104883502, Sep. 2, 2015, 11 pages.
Machine Translation and Abstract of Chinese Publication No. CN201378223, Jan. 6, 2010, 5 pages.
Machine Translation and Abstract of Japanese Publication No. JP2005021453, Jan. 27, 2005, 19 pages.
Foreign Communication From a Counterpart Application, European Application No. 16894878.4, Extended European Search Report dated Nov. 30, 2018, 11 pages.
Foreign Communication From a Counterpart Application, PCT Application No. PCT/CN2016/077119, English Translation of International Search Report dated Dec. 8, 2016, 2 pages.
Foreign Communication From a Counterpart Application, PCT Application No. PCT/CN2016/077119, English Translation of Written Opinion dated Dec. 8, 2016, 6 pages.

* cited by examiner

CAMERA FOCUSING METHOD, APPARATUS, AND DEVICE FOR TERMINAL

CROSS-REFERENCE TO RELATED APPLICATIONS

This application is a U.S. National Stage of International Patent Application No. PCT/CN2016/077119 filed on Mar. 23, 2016, which is hereby incorporated by reference in its entirety.

TECHNICAL FIELD

The present invention relates to the field of electronic device technologies, and in particular, to a camera focusing method, apparatus, and device for a terminal.

BACKGROUND

With development of the field of electronic device technologies, and in particular, with popularization of photographing devices, a user imposes a higher requirement on a focusing speed in a photographing process. Currently, commonly used focus algorithms mainly include active focusing and passive focusing. The active focusing may be specifically completed by using a ranging method, and the passive focusing may be specifically completed by using a hill climbing method. In the hill climbing method, focusing is completed mainly by analyzing definition of images corresponding to all lens positions, finding a lens position with maximum contrast, and using the lens position as a lens position corresponding to an in-focus image. In the ranging method, focusing is completed mainly by calculating, according to an object distance, a lens position corresponding to an in-focus image, and moving a voice coil motor (English: Voice Coil Motor, VCM for short) to enable the VCM to reach the specified lens position. In a process of completing focusing by using the hill climbing method, images obtained by moving a VCM to multiple lens positions need to be obtained, and definition of all the images is compared and analyzed, that is, a lot of time needs to be consumed for completing a hill climbing method-based focusing solution. Therefore, to quickly and accurately complete focusing, the ranging method with relatively high costs is usually used to implement a focusing process. In a process of performing focusing by using the ranging method, an object distance may be measured in a binocular ranging manner or a laser ranging manner. A ranging range can reach two meters by means of binocular ranging, and in comparison with a laser ranging process, ranging of an entire image can be completed by means of binocular ranging. Therefore, an object distance of an image subject is usually calculated by means of binocular ranging, and then a VCM is moved to enable the VCM to reach a specified lens position, so as to complete an active focusing process.

However, the binocular ranging has limitations, for example, precision is extremely poor in a case of an object under low illuminance, in a flat area, and with repeated patterns. Ranging precision is relatively low when a VCM position is relatively far from an in-focus location. Overall ranging precision is lower than laser ranging precision. Therefore, when an object in a focusing window has a relatively weak texture, for example, a white wall or a blue sky, or when an object in a focusing window has repeated patterns, for example, a plaid shirt, in these scenarios, it is very likely to obtain incorrect depth information if active focusing is completed by means of binocular ranging in combination with a VCM. Consequently, a focusing process fails, and focusing process precision is greatly reduced.

SUMMARY

Embodiments of the present invention provide a camera focusing method, apparatus, and device for a terminal, so as to improve focusing precision of a terminal in a camera focusing process.

To achieve the foregoing objective, the following technical solutions are used in the embodiments of the present invention:

According to a first aspect, an embodiment of the present invention provides a camera focusing method for a terminal, where the terminal includes a laser sensor, a first camera, and a second camera, the first camera and the second camera are disposed side by side, and the method includes: obtaining a first confidence and a second confidence, where the first confidence is a confidence of an object distance obtained by means of measurement in a laser ranging manner, the second confidence is a confidence of an object distance obtained by means of measurement in a binocular ranging manner, and a confidence is used to indicate accuracy of an object distance obtained by means of measurement in a ranging manner; determining a target ranging manner and a target object distance when the first confidence and the second confidence meet a preset condition, where the preset condition is that the first confidence is greater than a first confidence threshold, and/or the second confidence is greater than a second confidence threshold, and the target ranging manner is the laser ranging manner or the binocular ranging manner; and determining a target position in a lens position interval, so as to help the first camera and the second camera complete focusing.

In the prior art, an object distance of an image subject is calculated by means of binocular ranging, and then a VCM is controlled to move a lens to a specified lens position to complete an active focusing process. By contrast, according to the method, different ranging manners may be determined as a target ranging manner according to requirements in different application scenarios and a target object distance is also determined, and then in a lens position interval, a focusing process is completed around an in-focus point. That is, in the present invention, different ranging manners may be used for different cases, so as to effectively avoid a problem of a focusing failure that is caused when an object in a focusing window has a relatively weak texture or an object in a focusing window has repeated patterns. Therefore, a position of the in-focus point can be quickly and accurately determined, and further a focusing process of the first camera and the second camera is completed. In conclusion, focusing precision of a terminal in a camera focusing process can be improved in the present invention.

With reference to the first aspect, in a first possible implementation of the first aspect, before the determining a target ranging manner and a target object distance when the first confidence and the second confidence meet a preset condition, the method includes: obtaining a first object distance and a second object distance, where the first object distance is the object distance obtained by means of measurement in the laser ranging manner, and the second object distance is the object distance obtained by means of measurement in the binocular ranging manner; and the determining a target ranging manner and a target object distance when the first confidence and the second confidence meet a preset condition includes: when the first confidence is greater than the first confidence threshold, the second confidence is greater than the second confidence threshold, and an absolute value of a difference between the first object distance and the second object distance is less than an object distance difference threshold, determining that the ranging manner is the binocular ranging manner, and determining that the second object distance is the target object distance; or when the first confidence is less than or equal to the first confidence threshold, and the second confidence is greater than the second confidence threshold, determining that the ranging manner is the binocular ranging manner, and determining that the second object distance is the target object distance; or when the first confidence is greater than the first confidence threshold, the second confidence is greater than the second confidence threshold, and an absolute value of a difference between the first object distance and the second object distance is greater than or equal to the object distance difference threshold, determining that the ranging manner is the laser ranging manner, and determining that the first object distance is the target object distance; or when the first confidence is greater than the first confidence threshold, and the second confidence is less than or equal to the second confidence threshold, determining that the ranging manner is the laser ranging manner, and determining that the first object distance is the target object distance.

On a basis of the implementation of the first aspect, according to the method, a more proper ranging manner can be determined in the laser ranging manner and the binocular ranging manner by separately comparing the first confidence and the first confidence threshold, and the second confidence and the second confidence threshold. Further, specifically, different ranging manners may be determined as a target ranging manner according to requirements in different application scenarios and a target object distance is determined, and then in a lens position interval, a focusing process is completed around an in-focus point. That is, the present invention provides a method that is specifically used for determining a ranging manner and a target object distance, so that focusing precision of a terminal in a camera focusing process is further improved.

With reference to the first possible implementation of the first aspect, in a second possible implementation of the first aspect, the first camera collects a first image, and sends the first image to a display of the terminal to help a user preview the first image, a second image collected by the second camera is not used for user preview, and a speed of collecting the second image by the second camera is greater than a speed of collecting the first image by the first camera.

On a basis of the first possible implementation of the first aspect, according to the method, in consideration of a correlation between a focusing speed and an image collection speed, respective characteristics of the two cameras are fully used, so that not only an effect of displaying the first image used for user preview can be ensured, but also the second image that is not used for user preview can be ensured, to provide a quicker focusing effect for the user.

With reference to the second possible implementation of the first aspect, in a third possible implementation of the first aspect, the determining that the ranging manner is the binocular ranging manner, and determining that the second object distance is the target object distance includes: determining that the second object distance obtained by means of ranging according to the first image and the second image is the target object distance.

On a basis of the second possible implementation of the first aspect, according to the method, a specific manner of determining that the second object distance is the target object distance is provided, that is, ranging is performed according to the first image and the second image.

With reference to the second or the third possible implementation of the first aspect, in a fourth possible implementation of the first aspect, the first camera includes a first lens, the second camera includes a second lens and a second voice coil motor VCM, and before the determining a target position in a lens position interval, the method includes: determining an initial position corresponding to the target object distance, where the initial position is a position of the first lens and a position of the second lens that are determined according to the target object distance; and the determining a target position in a lens position interval includes: controlling the second VCM to move the second lens in the lens position interval by using the initial position as a start point, to complete preliminary focusing; and determining, as the target position, a lens position corresponding to a second image with maximum contrast in all preliminary focusing results.

On a basis of the second or the third possible implementation of the first aspect, according to the method, internal structures of the two cameras are limited, and the initial position is determined as the start point in an improved hill climbing method, so as to complete a target position determining process in the lens position interval by using an in-focus point or a lens position around an in-focus point as a start point. Compared with a conventional hill climbing method, this reduces a target position determining time, and further improves a terminal focusing speed.

With reference to the fourth possible implementation of the first aspect, in a fifth possible implementation of the first aspect, the first camera includes a first VCM, and after the determining a target position in a lens position interval, the method includes: controlling the second VCM to move the second lens to the target position, and obtaining a focusing result of the second camera; synchronizing the focusing result of the second camera to the first camera; and controlling the first VCM to move the first lens to the target position according to the focusing result of the second camera.

On a basis of the fourth possible implementation of the first aspect, according to the method, an internal structure of the first camera is further limited, and in addition, in consideration that the speed of collecting an image by the first camera is less than the speed of collecting an image by the second camera, the second camera has a higher focusing speed, that is, the second camera completes a focusing process before the first camera. Therefore, a method for synchronizing the focusing result of the second camera to the first camera is provided, that is, a speed of completing a focusing process by the two cameras is further improved without affecting collection, by the first camera, of an image used for preview.

According to a second aspect, an embodiment of the present invention provides a camera focusing apparatus for a terminal, where the terminal includes a laser sensor, a first camera, and a second camera, the first camera and the second camera are disposed side by side, and the apparatus includes: an obtaining module, configured to obtain a first confidence and a second confidence, where the first confidence is a confidence of an object distance obtained by means of measurement in a laser ranging manner, the second confidence is a confidence of an object distance obtained by means of measurement in a binocular ranging manner, and a confidence is used to indicate accuracy of an object distance obtained by means of measurement in a ranging manner; and a determining module, configured to determine a target ranging manner and a target object distance when the first confidence and the second confidence that are obtained by the obtaining module meet a preset condition, where the preset condition is that the first confidence is greater than a first confidence threshold, and/or the second confidence is greater than a second confidence threshold, and the target ranging manner is the laser ranging manner or the binocular ranging manner, where the determining module is further configured to determine a target position in a lens position interval, so as to help the first camera and the second camera complete focusing.

In the prior art, an object distance of an image subject is calculated by means of binocular ranging, and then a VCM is controlled to move a lens to a specified lens position to complete an active focusing process. By contrast, the apparatus may determine different ranging manners as a target ranging manner according to requirements in different application scenarios and also determine a target object distance, and then in a lens position interval, a focusing process is completed around an in-focus point. That is, in the present invention, different ranging manners may be used for different cases, so as to effectively avoid a problem of a focusing failure that is caused when an object in a focusing window has a relatively weak texture or an object in a focusing window has repeated patterns. Therefore, a position of the in-focus point can be quickly and accurately determined, and further a focusing process of the first camera and the second camera is completed. In conclusion, focusing precision of a terminal in a camera focusing process can be improved in the present invention.

With reference to the second aspect, in a first possible implementation of the second aspect, the obtaining module is further configured to obtain a first object distance and a second object distance, where the first object distance is the object distance obtained by means of measurement in the laser ranging manner, and the second object distance is the object distance obtained by means of measurement in the binocular ranging manner; and the determining module is specifically configured to: when the first confidence obtained by the obtaining module is greater than the first confidence threshold, the second confidence is greater than the second confidence threshold, and an absolute value of a difference between the first object distance and the second object distance is less than an object distance difference threshold, determine that the ranging manner is the binocular ranging manner, and determine that the second object distance is the target object distance; or when the first confidence is less than or equal to the first confidence threshold, and the second confidence is greater than the second confidence threshold, determine that the ranging manner is the binocular ranging manner, and determine that the second object distance is the target object distance; or when the first confidence is greater than the first confidence threshold, the second confidence is greater than the second confidence threshold, and an absolute value of a difference between the first object distance and the second object distance is greater than or equal to the object distance difference threshold, determine that the ranging manner is the laser ranging manner, and determine that the first object distance is the target object distance; or when the first confidence is greater than the first confidence threshold, and the second confidence is less than or equal to the second confidence threshold, determine that the ranging manner is the laser ranging manner, and determine that the first object distance is the target object distance.

With reference to the first possible implementation of the second aspect, in a second possible implementation of the second aspect, the first camera collects a first image, and sends the first image to a display of the terminal to help a user preview the first image, a second image collected by the second camera is not used for user preview, and a speed of collecting the second image by the second camera is greater than a speed of collecting the first image by the first camera.

With reference to the second possible implementation of the second aspect, in a third possible implementation of the second aspect, the determining that the ranging manner is the binocular ranging manner, the determining module is specifically configured to determine that the second object distance obtained by means of ranging according to the first image and the second image is the target object distance.

With reference to the second or the third possible implementation of the second aspect, in a fourth possible implementation of the second aspect, the first camera includes a first lens, the second camera includes a second lens and a second voice coil motor VCM, and the determining module is further configured to determine an initial position corresponding to the target object distance, where the initial position is a position of the first lens and a position of the second lens that are determined according to the target object distance; and the determining module is specifically configured to: control the second VCM to move the second lens in the lens position interval by using the initial position as a start point, to complete preliminary focusing; and determine, as the target position, a lens position corresponding to a second image with maximum contrast in all preliminary focusing results.

With reference to the fourth possible implementation of the second aspect, in a fifth possible implementation of the second aspect, the first camera includes a first VCM, and the apparatus includes: a control module, configured to: control the second VCM to move the second lens to the target position, and obtain a focusing result of the second camera; and a synchronization module, configured to synchronize the focusing result of the second camera that is obtained by the control module to the first camera, where the control module is further configured to control the first VCM to move the first lens to the target position according to the focusing result of the second camera that is synchronized by the synchronization module.

According to a third aspect, an embodiment of the present invention provides a camera focusing device for a terminal, where the terminal includes a laser sensor, a first camera, and a second camera, the first camera and the second camera are disposed side by side, and the device includes: an interface circuit, configured to obtain a first confidence and a second confidence, where the first confidence is a confidence of an object distance obtained by means of measurement in a laser ranging manner, the second confidence is a confidence of an object distance obtained by means of measurement in a binocular ranging manner, and a confidence is used to indicate accuracy of an object distance obtained by means of measurement in a ranging manner; and a processor, configured to determine a target ranging manner and a target object distance when the first confidence and the second confidence that are obtained by the interface circuit meet a preset condition, where the preset condition is that the first confidence is greater than a first confidence threshold, and/or the second confidence is greater than a second confidence threshold, and the target ranging manner is the laser ranging manner or the binocular ranging manner, where the processor is further configured to determine a target position in a lens position interval, so as to help the first camera and the second camera complete focusing.

In the prior art, an object distance of an image subject is calculated by means of binocular ranging, and then a VCM is controlled to move a lens to a specified lens position to complete an active focusing process. By contrast, the device may determine different ranging manners as a target ranging manner according to requirements in different application scenarios and also determine a target object distance, and then in a lens position interval, a focusing process is completed around an in-focus point. That is, in the present invention, different ranging manners may be used for different cases, so as to effectively avoid a problem of a focusing failure that is caused when an object in a focusing window has a relatively weak texture or an object in a focusing window has repeated patterns. Therefore, a position of the in-focus point can be quickly and accurately determined, and further a focusing process of the first camera and the second camera is completed. In conclusion, focusing precision of a terminal in a camera focusing process can be improved in the present invention.

With reference to the third aspect, in a first possible implementation of the third aspect, before the target ranging manner and the target object distance are determined when the first confidence and the second confidence meet the preset condition, the interface circuit is further configured to obtain a first object distance and a second object distance, where the first object distance is the object distance obtained by means of measurement in the laser ranging manner, and the second object distance is the object distance obtained by means of measurement in the binocular ranging manner; and the processor is specifically configured to: when the first confidence obtained by the interface circuit is greater than the first confidence threshold, the second confidence is greater than the second confidence threshold, and an absolute value of a difference between the first object distance and the second object distance is less than an object distance difference threshold, determine that the ranging manner is the binocular ranging manner, and determine that the second object distance is the target object distance; or when the first confidence is less than or equal to the first confidence threshold, and the second confidence is greater than the second confidence threshold, determine that the ranging manner is the binocular ranging manner, and determine that the second object distance is the target object distance; or when the first confidence is greater than the first confidence threshold, the second confidence is greater than the second confidence threshold, and an absolute value of a difference between the first object distance and the second object distance is greater than or equal to the object distance difference threshold, determine that the ranging manner is the laser ranging manner, and determine that the first object distance is the target object distance; or when the first confidence is greater than the first confidence threshold, and the second confidence is less than or equal to the second confidence threshold, determine that the ranging manner is the laser ranging manner, and determine that the first object distance is the target object distance.

With reference to the first possible implementation of the third aspect, in a second possible implementation of the third aspect, the first camera collects a first image, and sends the first image to a display of the terminal to help a user preview the first image, a second image collected by the second camera is not used for user preview, and a speed of collecting the second image by the second camera is greater than a speed of collecting the first image by the first camera.

With reference to the second possible implementation of the third aspect, in a third possible implementation of the third aspect, the determining that the ranging manner is the binocular ranging manner, the processor is specifically configured to determine that the second object distance obtained by means of ranging according to the first image and the second image is the target object distance.

With reference to the second or the third possible implementation of the third aspect, in a fourth possible implementation of the third aspect, the first camera includes a first lens, the second camera includes a second lens and a second voice coil motor VCM, and before the target position is determined in the lens position interval, the processor is further configured to determine an initial position corresponding to the target object distance, where the initial position is a position of the first lens and a position of the second lens that are determined according to the target object distance; and the processor is specifically configured to: control the second VCM to move the second lens in the lens position interval by using the initial position as a start point, to complete preliminary focusing; and determine, as the target position, a lens position corresponding to a second image with maximum contrast in all preliminary focusing results.

With reference to the fourth possible implementation of the third aspect, in a fifth possible implementation of the third aspect, the first camera includes a first VCM, and after the target position is determined in the lens position interval, the processor is further configured to: control the second VCM to move the second lens to the target position, and obtain a focusing result of the second camera; the interface circuit is further configured to synchronize the focusing result of the second camera that is obtained by the processor to the first camera; and the processor is further configured to control the first VCM to move the first lens to the target position according to the focusing result of the second camera that is synchronized by the interface circuit.

According to a fourth aspect, an embodiment of the present invention provides a computer program product, where the computer program product includes a readable storage medium, configured to store computer program code, the computer program code runs on a processor, and the computer program code is used to: obtain a first confidence and a second confidence, where the first confidence is a confidence of an object distance obtained by means of measurement in a laser ranging manner, the second confidence is a confidence of an object distance obtained by means of measurement in a binocular ranging manner, and a confidence is used to indicate accuracy of an object distance obtained by means of measurement in a ranging manner; determine a target ranging manner and a target object distance when the first confidence and the second confidence meet a preset condition, where the preset condition is that the first confidence is greater than a first confidence threshold, and/or the second confidence is greater than a second confidence threshold, and the target ranging manner is the laser ranging manner or the binocular ranging manner; and determine a target position in a lens position interval, so as to help a first camera and a second camera complete focusing, where the first camera and the second camera are disposed side by side on a terminal, and the terminal further includes a laser sensor.

In the prior art, an object distance of an image subject is calculated by means of binocular ranging, and then a VCM is controlled to move a lens to a specified lens position to complete an active focusing process. By contrast, according to the product, different ranging manners may be determined as a target ranging manner according to requirements in different application scenarios and a target object distance is also determined, and then in a lens position interval, a focusing process is completed around an in-focus point. That is, in the present invention, different ranging manners may be used for different cases, so as to effectively avoid a problem of a focusing failure that is caused when an object in a focusing window has a relatively weak texture or an object in a focusing window has repeated patterns. Therefore, a position of the in-focus point can be quickly and accurately determined, and further a focusing process of the first camera and the second camera is completed. In conclusion, focusing precision of a terminal in a camera focusing process can be improved in the present invention.

With reference to the fourth aspect, in a first possible implementation of the fourth aspect, before the target ranging manner and the target object distance are determined when the first confidence and the second confidence meet the preset condition, the computer program code is further used to obtain a first object distance and a second object distance, where the first object distance is the object distance obtained by means of measurement in the laser ranging manner, and the second object distance is the object distance obtained by means of measurement in the binocular ranging manner; and the computer program code is specifically used to: when the first confidence is greater than the first confidence threshold, the second confidence is greater than the second confidence threshold, and an absolute value of a difference between the first object distance and the second object distance is less than an object distance difference threshold, determine that the ranging manner is the binocular ranging manner, and determine that the second object distance is the target object distance; or when the first confidence is less than or equal to the first confidence threshold, and the second confidence is greater than the second confidence threshold, determine that the ranging manner is the binocular ranging manner, and determine that the second object distance is the target object distance; or when the first confidence is greater than the first confidence threshold, the second confidence is greater than the second confidence threshold, and an absolute value of a difference between the first object distance and the second object distance is greater than or equal to the object distance difference threshold, determine that the ranging manner is the laser ranging manner, and determine that the first object distance is the target object distance; or when the first confidence is greater than the first confidence threshold, and the second confidence is less than or equal to the second confidence threshold, determine that the ranging manner is the laser ranging manner, and determine that the first object distance is the target object distance.

With reference to the first possible implementation of the fourth aspect, in a second possible implementation of the fourth aspect, the first camera collects a first image, and sends the first image to a display of the terminal to help a user preview the first image, a second image collected by the second camera is not used for user preview, and a speed of collecting the second image by the second camera is greater than a speed of collecting the first image by the first camera.

With reference to the second possible implementation of the fourth aspect, in a third possible implementation of the fourth aspect, the determining that the ranging manner is the binocular ranging manner, the computer program code is specifically used to determine that the second object distance obtained by means of ranging according to the first image and the second image is the target object distance.

With reference to the second or the third possible implementation of the fourth aspect, in a fourth possible implementation of the fourth aspect, the first camera includes a first lens, the second camera includes a second lens and a second voice coil motor VCM, and before the target position is determined in the lens position interval, the computer program code is further used to determine an initial position corresponding to the target object distance, where the initial position is a position of the first lens and a position of the second lens that are determined according to the target object distance; and the computer program code is specifically used to: control the second VCM to move the second lens in the lens position interval by using the initial position as a start point, to complete preliminary focusing; and determine, as the target position, a lens position corresponding to a second image with maximum contrast in all preliminary focusing results.

With reference to the fourth possible implementation of the fourth aspect, in a fifth possible implementation of the fourth aspect, the first camera includes a first VCM, and after the target position is determined in the lens position interval, the computer program code is further used to: control the second VCM to move the second lens to the target position, and obtain a focusing result of the second camera; synchronize the focusing result of the second camera to the first camera; and control the first VCM to move the first lens to the target position according to the focusing result of the second camera.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
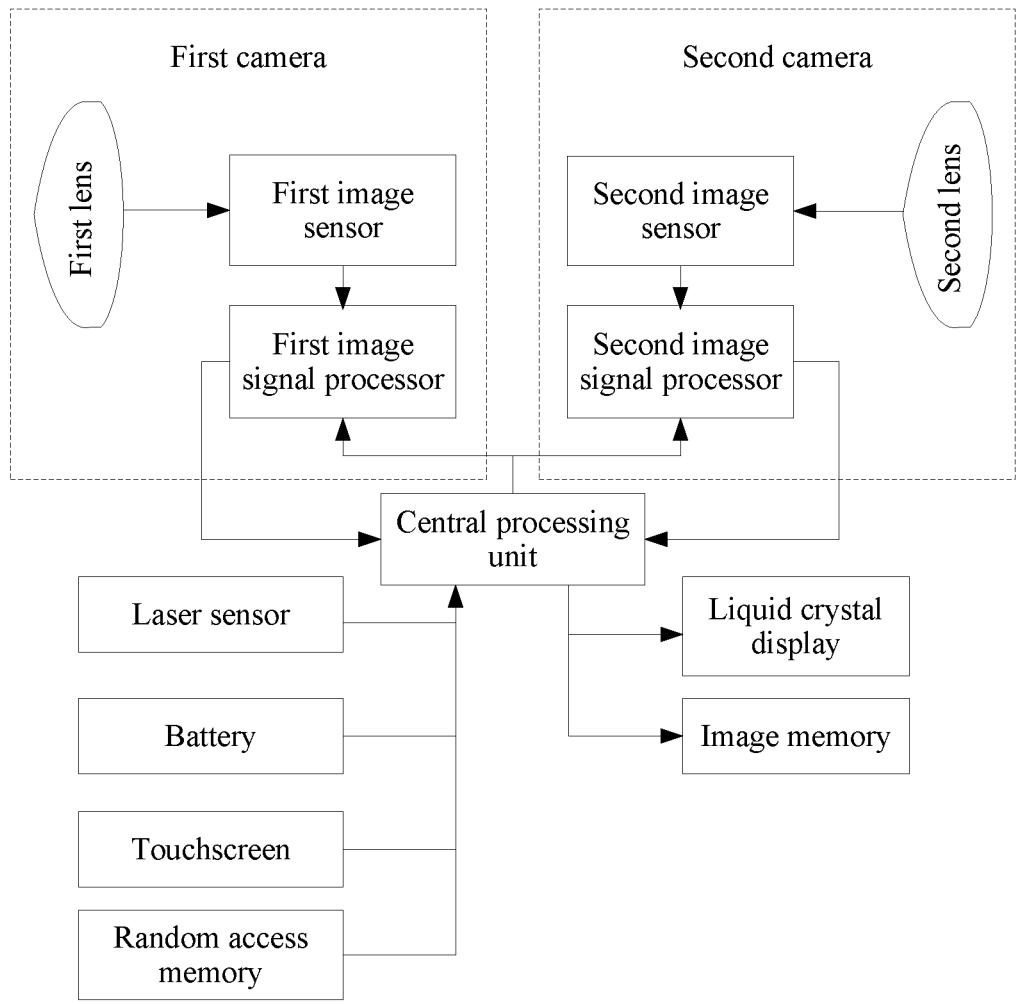
FIG. 1 is a schematic structural diagram of a ranging focusing system according to an embodiment of the present invention.

The embodiments of the present invention may be applied to a ranging focusing system. The system has a binocular ranging function, a laser ranging function, and a focusing function. For example, a ranging focusing system shown in FIG. 1 includes a first lens, a second lens, a first image sensor (English: Image Sensor), a second image sensor, a first image signal processor (English: Image Signal Processor, ISP for short), a second image signal processor, a central processing unit (English: Central Processing Unit, CPU for short), a liquid crystal display (English: Liquid Crystal Display, LCD for short), an image memory, a laser sensor, a battery, a touchscreen, and a random access memory (English: Random Access Memory, RAM for short). A first camera includes the first lens, the first image sensor, and the first image signal processor. A second camera includes the second lens, the second image sensor, and the second image signal processor.

A binocular ranging manner is a method that is mainly based on a parallax principle and in which when both the first camera and the second camera are in a working mode, two images of a measured object are collected from different positions, and three-dimensional geometry information of the object is obtained by calculating a position deviation between points corresponding to the two images. That is, the first camera may send an obtained image to the central processing unit by using the first image sensor and the first image signal processor for processing, and the second camera may send an obtained image to the central processing unit by using the second image sensor and the second image signal processor for processing. The central processing unit then completes ranging and focusing, and feeds back processing results to the first image signal processor and the first image signal processor. It should be noted that the first camera and the second camera may work at the same time, or work at different times according to a current requirement. Whether a working time of the first camera and a working time of the second camera are consistent is not specifically limited in the embodiments of the present invention, and may be adjusted according to a requirement in an application scenario.

In a laser ranging manner, a distance from a measured object is accurately measured mainly by using a laser. When laser ranging is performed, an emitter in the laser sensor emits a beam of extremely thin laser to a target, and then a photoelectric element receives a laser beam reflected from the measured object. In addition, a timer in the laser sensor determines a time from laser beam emitting to laser beam receiving, and then a distance between an observer and the measured object is calculated, that is, an object distance. The object distance is then sent to the central processing unit, and the central processing unit completes focusing.

It should be noted that because there is no interference between execution of the laser ranging process and execution of the binocular ranging process, in the embodiments of the present invention, the two ranging manners may be simultaneously executed. In addition, the laser ranging manner and the binocular ranging manner have respective advantages and disadvantages, and details are shown in Table 1.

TABLE 1

| Characteristic | Laser ranging manner | Binocular ranging manner (Binocular stereoscopic vision ranging manner) |
|---|---|---|
| Advantages | Precision is relatively high, and generally a maximum error is 5%. | A ranging range is relatively large, and generally can reach two meters, that is, ranging can be performed on an entire image. |
| Disadvantages | Impact of object reflectivity is relatively large. For example, a relatively large ranging error is very likely to occur when a photo is taken through glass. A ranging range is relatively small, and generally the ranging range is less than one meter. An FOV (Field Of View, field of view) is relatively small, and generally only a central area of an image can be measured. | Ranging precision is relatively poor in a case of an image under low illuminance, in a flat area, or with repeated patterns. Ranging precision is relatively low when a current motor position is relatively far from an in-focus location. Overall ranging precision is lower than that in the laser ranging manner. |

Figure 2:
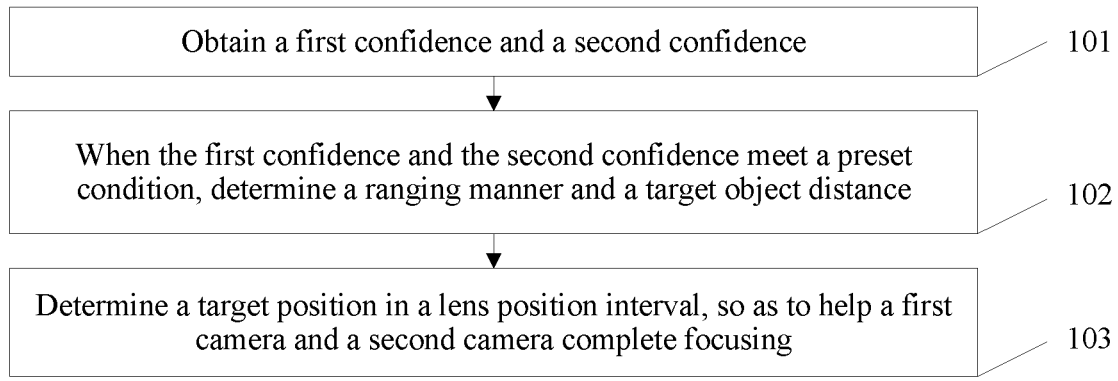
FIG. 2 is a flowchart of a camera focusing method for a terminal according to an embodiment of the present invention.

An embodiment of the present invention provides a camera focusing method for a terminal. As shown in FIG. 2, the method is performed by a device that has a focusing function, for example, a terminal. The terminal includes a laser sensor, a first camera, and a second camera. The first camera and the second camera are disposed side by side. The method includes the following steps.

101. Obtain a first confidence and a second confidence.

The first confidence is a confidence of an object distance obtained by means of measurement in a laser ranging manner, the second confidence is a confidence of an object distance obtained by means of measurement in a binocular ranging manner, and a confidence is used to indicate accuracy of an object distance obtained by means of measurement in a ranging manner.

In the laser ranging manner, an emitter of the device emits a laser, and some photons in the laser are reflected to a receiver after the laser is cast on an object. Therefore, a laser ranging module may determine the first confidence by calculating a ratio of a quantity of received reflected photons to a quantity of photons emitted by the emitter. It should be noted that generally, a shorter distance between an object and a lens indicates a higher confidence, and a longer distance between an object and a lens indicates a lower confidence. A manner of obtaining the first confidence is not limited to the foregoing manner, and is not specifically limited in this embodiment of the present invention.

In the binocular ranging manner, a value of the second confidence may be indicated by a quantity of feature points, or indicated by a ratio of a quantity of high confidence feature points to a quantity of all feature points. A manner of determining the quantity of feature points and the high confidence feature point is proposed below, and details are not described herein. It should be noted that a manner of indicating the second confidence is not specifically limited in this embodiment of the present invention, and a manner of obtaining the second confidence is not limited to the foregoing manner.

102. Determine a ranging manner and a target object distance when the first confidence and the second confidence meet a preset condition.

The preset condition is that the first confidence is greater than a first confidence threshold, and/or the second confidence is greater than a second confidence threshold. The ranging manner is the laser ranging manner or the binocular ranging manner.

It should be noted that to ensure accuracy of a focusing process, when the first confidence is less than or equal to the first confidence threshold, and the second confidence is less than or equal to the second confidence threshold, a conventional hill climbing method may be used to perform focusing. That is, a device that has a focusing function analyzes definition of images corresponding to different lens positions, finds a lens position with maximum contrast, and uses the lens position as a lens position corresponding to an in-focus image, and then a VCM moves a lens to the lens position corresponding to the in-focus image, so as to complete focusing.

In this embodiment of the present invention, the used ranging manner may be accurately determined with reference to the first confidence threshold, the first confidence, the second confidence threshold, and the second confidence. The first confidence threshold and the second confidence threshold may be preset by working personnel according to a historical empirical value, or may be pre-generated by the device according to a specific rule. A manner of setting the first confidence threshold and the second confidence threshold is not specifically limited in this embodiment of the present invention.

It should be noted that a first lens in the first camera and a second lens in the second camera may share one VCM, or a unique corresponding VCM is disposed for each lens. In addition, a VCM may be disposed in a camera, or may be individually disposed outside a camera. In this embodiment of the present invention, a manner of disposing a VCM, and a correspondence between the VCM and a lens are not specifically limited, and may be set according to a requirement in an application scenario.

103. Determine a target position in a lens position interval, so as to help the first camera and the second camera complete focusing.

In a process of performing ranging in the binocular ranging manner or the laser ranging manner, because an error may exist, a lens position corresponding to an in-focus image may not be accurately determined according to an obtained object distance. Therefore, in this embodiment of the present invention, to ensure that the VCM can move the lens to the lens position corresponding to the in-focus image, an image not only needs to be collected at a lens position corresponding to the obtained object distance, but also needs to be collected by traversing all lens positions in the lens position interval, and then the target position is determined. It should be noted that because the lens position interval is an interval range determined at delivery of the device, that is, an interval formed between a lens short focusing position and a lens long focusing position, the lens position interval may include multiple lens positions, and these lens positions should include the lens position corresponding to the in-focus image, and further include a lens position corresponding to the target object distance. Although an error may exist in the binocular ranging manner or the laser ranging manner, a margin of error is relatively small, that is, the lens position determined according to the measured object distance is a lens position around the lens position corresponding to the in-focus image.

In this embodiment of the present invention, the lens position corresponding to the target object distance may be specifically used as a start point for traversing the lens position interval, a step for a traversing process is determined according to a historical empirical value, and then the lens position interval is traversed towards a short focusing position or a long focusing position according to a user requirement until the target position is obtained. It should be noted that a manner of determining the target position is not limited to the foregoing manner. In this embodiment of the present invention, the manner of determining the target position is not specifically limited.

It should be noted that for a process of determining the target position, refer to a process of completing focusing by using the conventional hill climbing method in the prior art, or refer to a process of completing focusing by using a ranging method in the prior art, and the VCM is controlled to move the lens to the target position to complete focusing.

According to the camera focusing method for a terminal provided in this embodiment of the present invention, the confidences of the object distances obtained in the laser ranging manner and the binocular ranging manner are separately obtained, when at least one of the two confidences is greater than a confidence threshold corresponding to the confidence, the target ranging manner and the target object distance are determined, and then the target position is determined in the lens position interval, so as to help the first camera and the second camera complete focusing. A confidence is used to indicate accuracy of an object distance obtained by means of measurement in a ranging manner. In the prior art, an object distance of an image subject is calculated by means of binocular ranging, and then a VCM is controlled to enable a lens to reach a specified lens position to complete an active focusing process. By contrast, in the present invention, different ranging manners may be determined as a target ranging manner according to requirements in different application scenarios and a target object distance is also determined, and then in a lens position interval, a focusing process is completed around an in-focus point. That is, in the present invention, different ranging manners may be used for different cases, so as to effectively avoid a problem of a focusing failure that is caused when an object in a focusing window has a relatively weak texture or an object in a focusing window has repeated patterns. Therefore, a position of the in-focus point can be quickly and accurately determined, and further a focusing process of the first camera and the second camera is completed. In conclusion, focusing precision of a terminal in a camera focusing process can be improved in the present invention.

Figure 3:
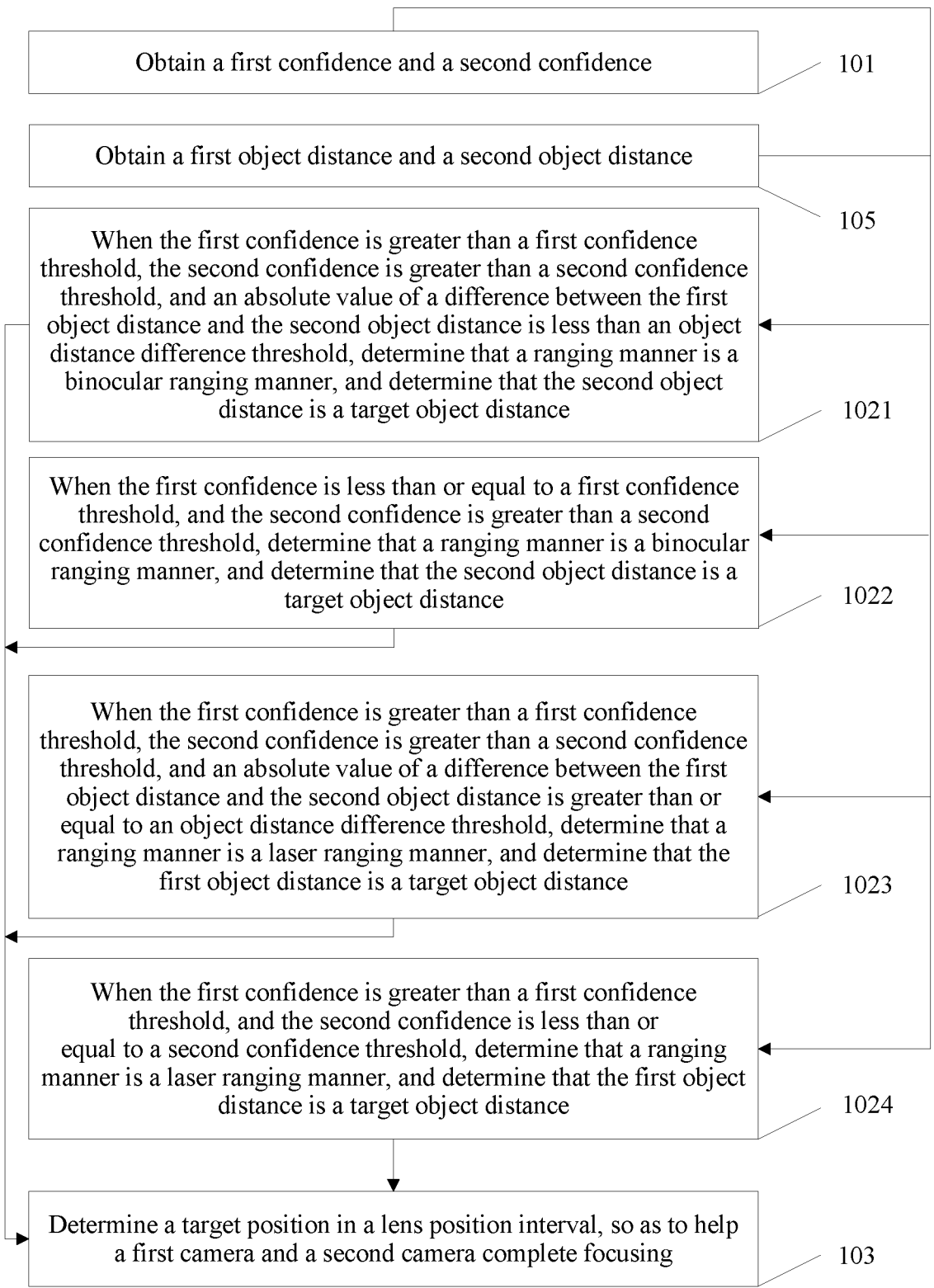
FIG. 3 is a flowchart of another camera focusing method for a terminal according to an embodiment of the present invention.

Different ranging manners are applicable to different application scenarios. Therefore, to ensure that a selected ranging manner can adapt to a current application scenario, in an implementation of this embodiment of the present invention, a more proper ranging manner may be determined in the laser ranging manner and the binocular ranging manner by separately comparing the first confidence and the first confidence threshold, and the second confidence and the second confidence threshold. Therefore, based on the implementation shown in FIG. 2, an implementation shown in FIG. 3 may be further implemented. Step 104 may be performed before step 102 in which the ranging manner and the target object distance are determined when the first confidence and the second confidence meet the preset condition is performed, and step 102 may be specifically implemented by step 1021 to step 1024.

105. Obtain a first object distance and a second object distance.

The first object distance is the object distance obtained by means of measurement in the laser ranging manner, and the second object distance is the object distance obtained by means of measurement in the binocular ranging manner.

1021. When the first confidence is greater than a first confidence threshold, the second confidence is greater than a second confidence threshold, and an absolute value of a difference between the first object distance and the second object distance is less than an object distance difference threshold, determine that the ranging manner is a binocular ranging manner, and determine that the second object distance is the target object distance.

1022. When the first confidence is less than or equal to a first confidence threshold, and the second confidence is greater than a second confidence threshold, determine that the ranging manner is a binocular ranging manner, and determine that the second object distance is the target object distance.

1023. When the first confidence is greater than a first confidence threshold, the second confidence is greater than a second confidence threshold, and an absolute value of a difference between the first object distance and the second object distance is greater than or equal to an object distance difference threshold, determine that the ranging manner is a laser ranging manner, and determine that the first object distance is the target object distance.

1024. When the first confidence is greater than a first confidence threshold, and the second confidence is less than or equal to a second confidence threshold, determine that the ranging manner is a laser ranging manner, and determine that the first object distance is the target object distance.

The target object distance is obtained by means of measurement in the binocular ranging manner, and this may be specifically implemented by calculating feature point depth information, that is, the target object distance, according to parallax between same feature points in images obtained by two cameras. The two cameras may be specifically the first camera and the second camera. Each camera may be considered as a focusing window, and an image obtained by the camera may be considered as an image in the focusing window. An image obtained by the first camera is a first image, and an image obtained by the second camera is a second image.

In the prior art, there are multiple manners of obtaining a feature point, for example, a Harris corner extraction method, or a SURF feature point extraction method.

After respective feature points of the first image and of the second image are separately successfully obtained, if a quantity of feature points in at least one of the first image or the second image is less than a given threshold T1, it is determined that a confidence is relatively low when ranging is performed in the binocular ranging manner. Weighted averaging is then performed on depth information of all feature points in the first image to obtain an average value of the depth information of all the feature points in the first image, and the average value is determined as a ranging result obtained by means of measurement in the binocular ranging manner, that is, an object distance. It should be noted that in a process of calculating the average value of the depth information, in consideration of a relatively small deviation between the first image and the second image, the first image is usually used as a to-be-displayed image for image display, that is, the first camera collects the first image, and sends the first image to a display of the terminal to help a user preview the first image. Therefore, generally, the object distance is determined depending on the average value of the depth information of the first image.

It should be noted that the second image collected by the second camera is not used for user preview. In addition, to ensure that the second camera can complete a focusing process as soon as possible, a speed of collecting the second image by the second camera is greater than a speed of collecting the first image by the first camera. For example, the first camera takes 12 frames of pictures every second, and the second camera takes 24 frames of pictures every second. Because a camera performs focusing in each photographing process, a camera that takes more frames of pictures every second has a higher focusing speed.

Alternatively, after feature points corresponding to each of the first image and the second image are determined, all feature points in the first image are sequentially matched with feature points in the second image in a left-to-right sequence, and at the same time, all the feature points in the first image are sequentially matched with the feature points in the second image in a right-to-left sequence. A feature point that is in the first image and that is matched with a same feature point in the second image is then determined as a high confidence feature point according to two matching results, and a ratio of a quantity of high confidence feature points to a quantity of all feature points in the first image is calculated. When the ratio is less than a given threshold T2, it is determined that a confidence is relatively low when ranging is performed in the binocular ranging manner.

It should be noted that in a process of calculating the ratio, in consideration of a relatively small deviation between the first image and the second image, the first image is usually used as a to-be-displayed image for image display. Therefore, generally, a quantity of all feature points is determined depending on the quantity of all feature points in the first image. To more accurately determine an object distance, in this embodiment of the present invention, depth information of all high confidence feature points may be separately determined, then an average value of the depth information of all the high confidence feature points is calculated, and the average value is determined as a ranging result obtained in the binocular ranging manner, that is, the object distance.

The given threshold T1 is used to determine whether the quantity of feature points meets a high confidence condition, and the given threshold T2 is used to determine whether the ratio of the quantity of high confidence feature points to the quantity of all feature points in the first image meets the high confidence condition. The given threshold T1 and the given threshold T2 may be preset by working personnel according to a historical empirical value. In this embodiment of the present invention, a manner of setting the given threshold T1 and the given threshold T2 is not specifically limited.

A confidence threshold is used as a criterion to weigh a confidence in both the laser ranging manner and the binocular ranging manner, and value statuses of the first confidence and the second confidence relative to confidence thresholds corresponding to the first confidence and the second confidence may be determined by using a value relationship between the first confidence and the first confidence threshold and a value relationship between the second confidence and the second confidence threshold.

The laser ranging manner and the binocular ranging manner have respective advantages and disadvantages shown in Table 1. Therefore, in this embodiment of the present invention, to better use characteristics of the laser ranging manner and the binocular ranging manner, different ranging manners may be selected according to different cases. A specific selection manner is as follows:

If confidences in both the laser ranging manner and the binocular ranging manner are relatively high, and two ranging results are similar, because the laser ranging manner has higher precision, the laser ranging manner is used to perform quick focusing; or if two ranging results differ considerably, in consideration that the laser ranging manner is affected by reflection from objects such as glass and a mirror, the binocular ranging manner is used to perform quick focusing. If only one of confidences in the laser ranging manner and the binocular ranging manner is relatively high, to improve focusing accuracy, a manner with a relatively high confidence may be selected to perform quick focusing. If confidences in both the laser ranging manner and the binocular ranging manner are relatively low, that is, a relatively large error exists in both ranging results obtained in the laser ranging manner and the binocular ranging manner, to implement accurate focusing, in this embodiment of the present invention, quick focusing may be abandoned, and the conventional hill climbing method is used to complete focusing.

It should be noted that, to avoid repeated ranging, in this embodiment of the present invention, because a focusing process needs to be completed at a relatively high speed, two ranging results may be obtained by means of measurement in the laser ranging manner and the binocular ranging manner at a same moment, then a ranging result corresponding to a specific ranging manner is determined for use by determining confidences, the obtained ranging result is directly obtained, and the ranging result is determined as the target object distance, so as to complete focusing.

According to the camera focusing method for a terminal provided in this embodiment of the present invention, the confidences of the object distances obtained in the laser ranging manner and the binocular ranging manner are separately obtained, when at least one of the two confidences is greater than a confidence threshold corresponding to the confidence, it is determined, according to the value relationship between the first confidence and the first confidence threshold and the value relationship between the second confidence and the second confidence threshold, to use the laser ranging manner or the binocular ranging manner to perform ranging, and after the target object distance is determined, the target position is determined in the lens position interval, so as to help the first camera and the second camera complete focusing. In the prior art, an object distance of an image subject is calculated by means of binocular ranging, and then a VCM is controlled to move a lens to a specified lens position to complete an active focusing process. By contrast, in the present invention, it is determined, by separately comparing confidences obtained in the laser ranging manner and the binocular ranging manner with respective corresponding confidence thresholds, to use the laser ranging manner or the binocular ranging manner to perform ranging, and then in a lens position interval, a focusing process is completed around an in-focus point. In the present invention, a ranging manner may be specifically selected according to value relationships between confidences in two ranging manners and respective corresponding confidence thresholds. Therefore, different ranging manners may be used for different cases, so as to avoid a focusing failure that is caused when an object in a focusing window has a relatively weak texture or an object in a focusing window has repeated patterns. Therefore, a position of the in-focus point can be quickly and accurately determined, and further a focusing process of the first camera and the second camera is completed. In conclusion, focusing precision of a terminal in a camera focusing process can be improved in the present invention.

Figure 4:
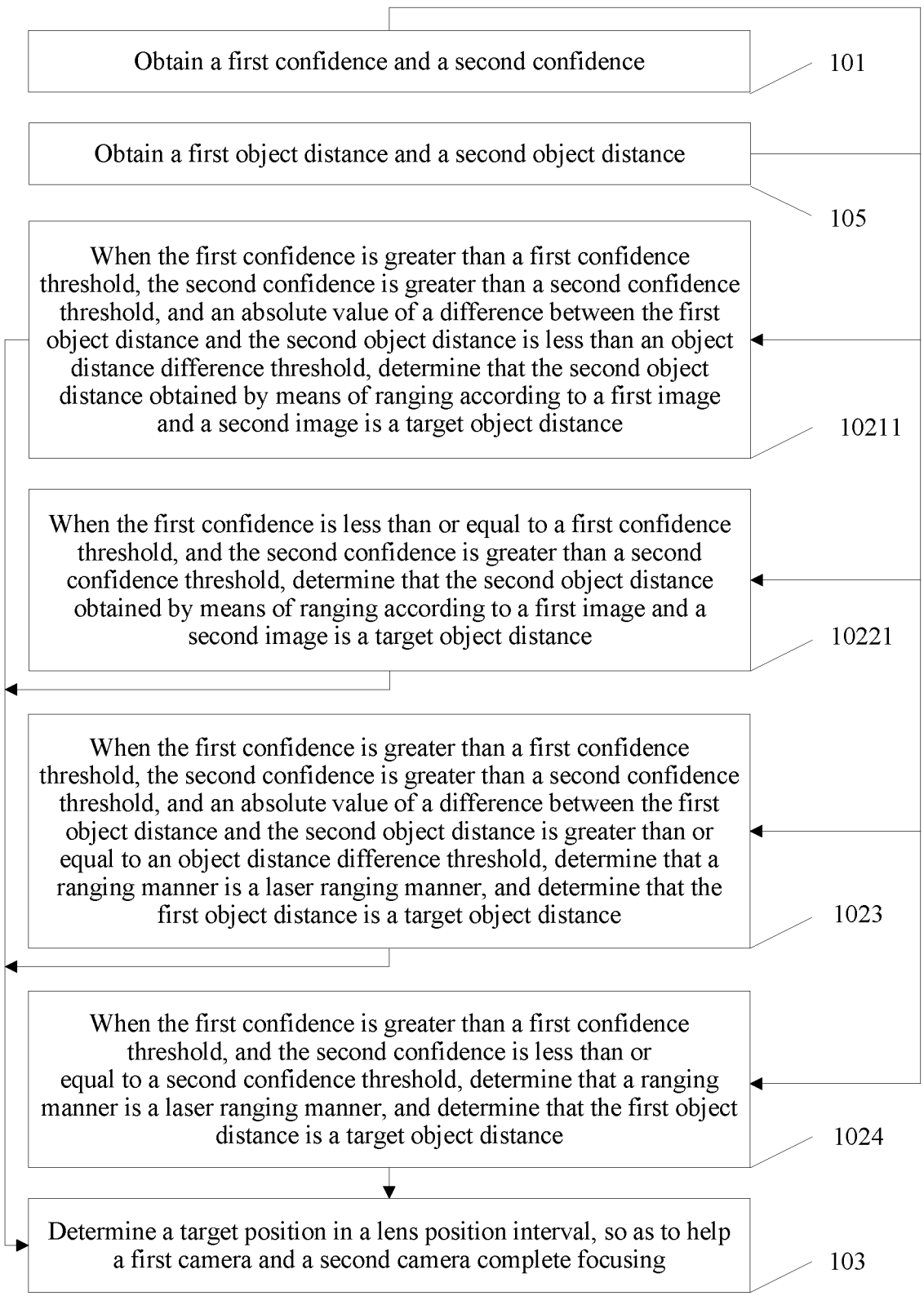
FIG. 4 is a flowchart of another camera focusing method for a terminal according to an embodiment of the present invention.

There is a linear relationship with a positive slope between a focusing speed and a speed of collecting an image by a camera. Cameras in the binocular ranging manner specifically include the first camera and the second camera, an image collected by the first camera is used for user preview, and an image collected by the second camera is not used for user preview. Therefore, to improve a focusing speed without affecting an effect of displaying the first image collected by the first camera, in an implementation of this embodiment of the present invention, a ranging speed of the second camera may be improved by improving a speed of collecting an image by the second camera, so as to improve the focusing speed. That is, in this embodiment of the present invention, the speed of collecting the second image by the second camera is greater than the speed of collecting an image by the first camera. Therefore, based on the implementation shown in FIG. 3, an implementation shown in FIG. 4 may be further implemented. Step 1021 in which when the first confidence is greater than the first confidence threshold, the second confidence is greater than the second confidence threshold, and the absolute value of the difference between the first object distance and the second object distance is less than the object distance difference threshold, it is determined that the ranging manner is the binocular ranging manner, and it is determined that the second object distance is the target object distance may be specifically implemented by step 10211. Step 1022 in which when the first confidence is less than or equal to the first confidence threshold, and the second confidence is greater than the second confidence threshold, it is determined that the ranging manner is the binocular ranging manner, and it is determined that the second object distance is the target object distance may be specifically implemented by step 10221.

10211. When the first confidence is greater than the first confidence threshold, the second confidence is greater than the second confidence threshold, and the absolute value of the difference between the first object distance and the second object distance is less than the object distance difference threshold, determine that the second object distance obtained by means of ranging according to a first image and a second image is the target object distance.

10221. When the first confidence is less than or equal to the first confidence threshold, and the second confidence is greater than the second confidence threshold, determine that the second object distance obtained by means of ranging according to a first image and a second image is the target object distance.

In a conventional solution in which a single lens uses the hill climbing method to perform focusing, in addition to being used for focusing, a previewed image needs to be used for display. Therefore, in consideration of an effect of displaying the previewed image, generally, high illuminance is 30 fps (English: frame per second), and low illuminance may be 16 fps or even less.

It should be noted that each time the VCM pushes the lens, definition of an image corresponding to a new lens position can be determined only after a next frame of image is generated, and further a next moving direction of pushing the lens by the VCM is determined. Therefore, a generation speed of the next frame of image determines a focusing speed to some extent, that is, a relatively high image collection speed indicates a relatively high focusing speed.

In this embodiment of the present invention, lenses in the binocular ranging manner include the first camera and the second camera, and an image collected by only one camera can be used for user preview at a same moment. Therefore, when an image collected by the first camera is used for user preview, and an image collected by the second camera does not need to be used for user preview, to ensure an effect of an image used for preview, an imaging speed of the first camera may be made lower than an imaging speed of the second camera. That is, definition of an image previewed by a user is ensured by displaying the image collected by the first camera, and ranging and focusing are completed by the second camera. That is, the first camera corresponding to a lower imaging speed ensures an image preview effect, and the second camera corresponding to a higher imaging speed ensures a focusing speed.

According to the camera focusing method for a terminal provided in this embodiment of the present invention, when the first confidence is greater than the first confidence threshold, the second confidence is greater than the second confidence threshold, and the absolute value of the difference between the first object distance and the second object distance is less than the object distance difference threshold, or when the first confidence is less than or equal to the first confidence threshold, and the second confidence is greater than the second confidence threshold, the target object distance is obtained in the binocular ranging manner. Specifically, the second object distance obtained by means of ranging according to the first image and the second image may be determined as the target object distance. In the prior art, an object distance of an image subject is calculated by means of binocular ranging, and then a VCM is controlled to enable a lens to reach a specified lens position to complete an active focusing process. By contrast, in the present invention, when the binocular ranging manner needs to be used to complete ranging, a focusing speed may be improved by using a characteristic in which an image collected by the first camera in two cameras is to be displayed and an image collected by the second camera is not to be displayed and by improving a speed of collecting an image by the second camera. Therefore, when a focusing failure that is caused when an object in a focusing window has a relatively weak texture or an object in a focusing window has repeated patterns is avoided, a method that is specifically used for determining a ranging manner and a target object distance is provided, and focusing precision of a terminal in a camera focusing process is further improved.

Figure 5A:
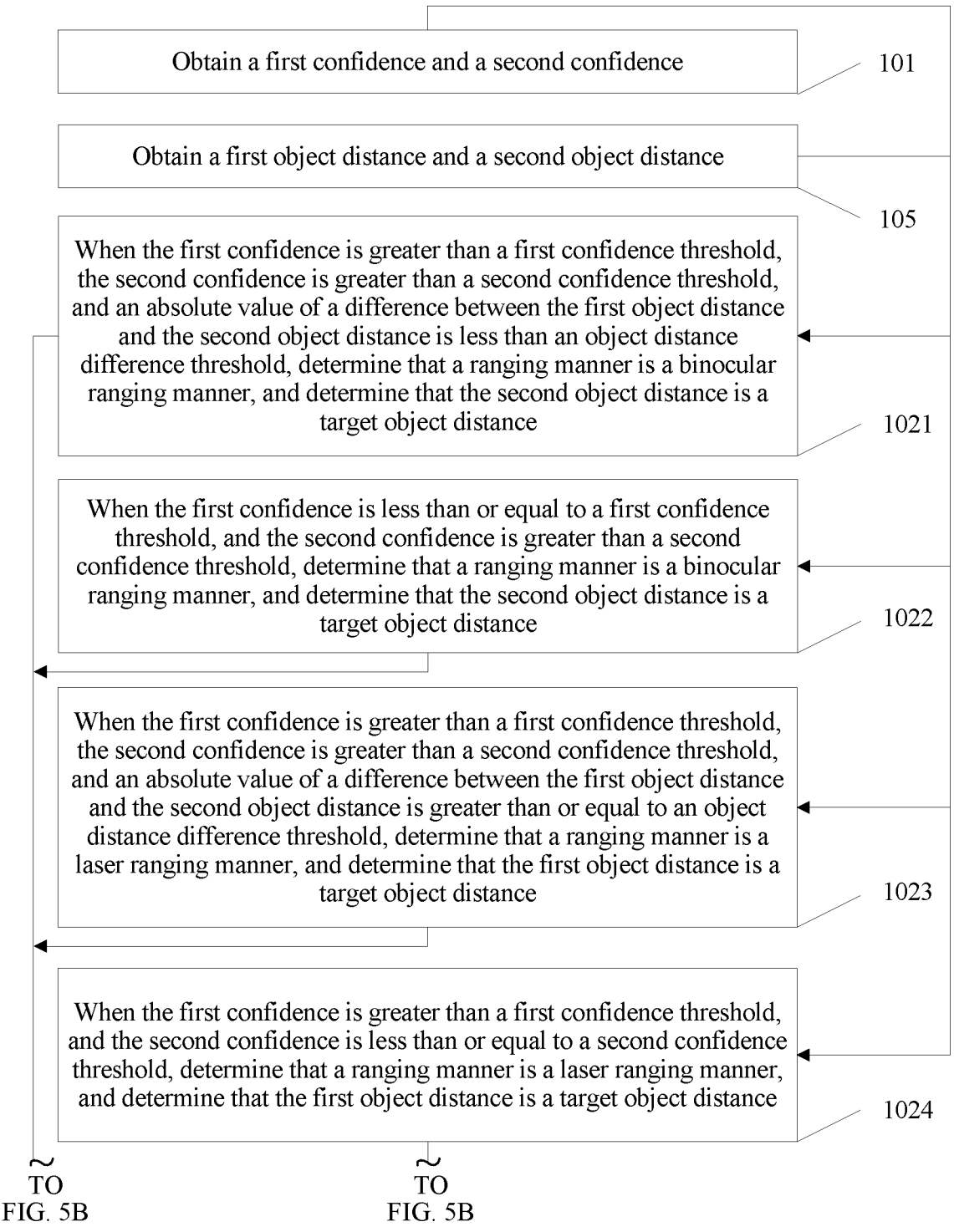
FIG. 5A and FIG. 5B are a flowchart of another camera focusing method for a terminal according to an embodiment of the present invention.
Figure 5B:
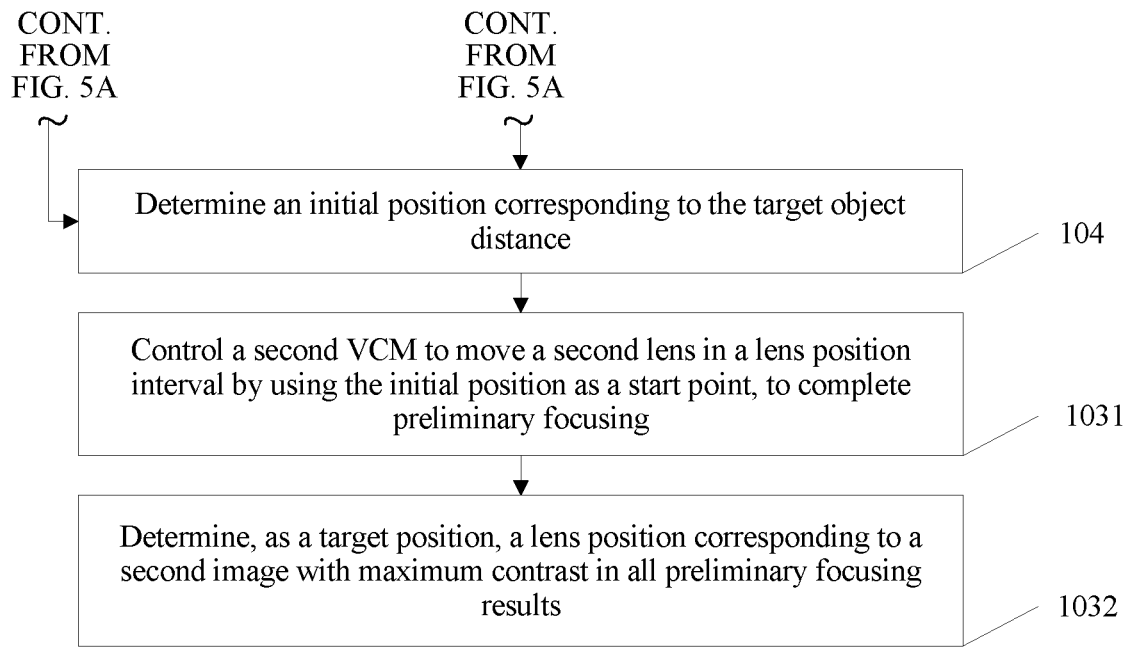

To determine an in-focus location as accurately as possible, in an implementation of this embodiment of the present invention, the first camera includes a first lens, and the second camera includes a second lens and a second VCM. The terminal can use an initial position as a start point, traverse multiple lens positions in the lens position interval according to a specific step, and determine the target position according to contrast of each image in a preliminary focusing result. Therefore, based on the implementation shown in FIG. 3, an implementation shown in FIG. 5A and FIG. 5B may be further implemented. Before step 103 in which the target position is determined in the lens position interval, so as to help the first camera and the second camera complete focusing is performed, step 104 may be further performed, and step 103 may be specifically implemented by step 1031 and step 1032.

104. Determine an initial position corresponding to the target object distance.

The initial position is a position of the first lens and a position of the second lens that are determined according to the target object distance.

Because one object distance is corresponding to one lens position, in consideration that the first lens and the second lens can be located at a same lens position in this embodiment of the present invention, determining the initial position corresponding to the target object distance is determining the lens position of the first lens and the lens position of the second lens that are corresponding to the target object distance. The lens position of the first lens is the same as the lens position of the second lens.

1031. Control the second VCM to move the second lens in the lens position interval by using the initial position as a start point, to complete preliminary focusing.

In this embodiment of the present invention, the initial position is the in-focus location or a lens position around the in-focus location. Therefore, to determine the target position as quickly as possible, the terminal may control the second VCM to move, by using the initial position as the start point, the second lens in a direction in which lens positions gradually become near or far, to complete preliminary focusing. In a lens moving process, traversing may be performed according to a preset step, or lens positions may be adjusted one by one according to positions of preset sampling points.

It should be noted that a manner of setting the step in the lens moving process and the sampling points is not specifically limited in this embodiment of the present invention, and may be preset by working personnel according to an empirical value.

1032. Determine, as the target position, a lens position corresponding to a second image with maximum contrast in all preliminary focusing results.

It should be noted that step 1031 and step 1032 may be considered as an improved hill climbing method. For a specific process of performing step 1031 and step 1032, refer to an implementation of the conventional hill climbing method, and details are not described.

According to the camera focusing method for a terminal provided in this embodiment of the present invention, the initial position corresponding to the target object distance is determined, and the second VCM is controlled to move the second lens in the lens position interval by using the initial position as the start point, to complete preliminary focusing. Then, the lens position corresponding to the second image with the maximum contrast in multiple preliminary focusing results is determined as the target position. In the prior art, an object distance of an image subject is calculated by means of binocular ranging, and then a VCM is controlled to enable a lens to reach a specified lens position to complete an active focusing process. By contrast, in the present invention, a lens position interval can be traversed by using an in-focus point or an initial position around an in-focus point as a start point until a target position in the lens position interval is determined. Therefore, when a focusing failure that is caused when an object in a focusing window has a relatively weak texture or an object in a focusing window has repeated patterns is avoided, that is, when focusing precision of a terminal in a camera focusing process can be improved in the present invention, the conventional hill climbing method may be improved to implement a quicker focusing process.

Figure 6A:
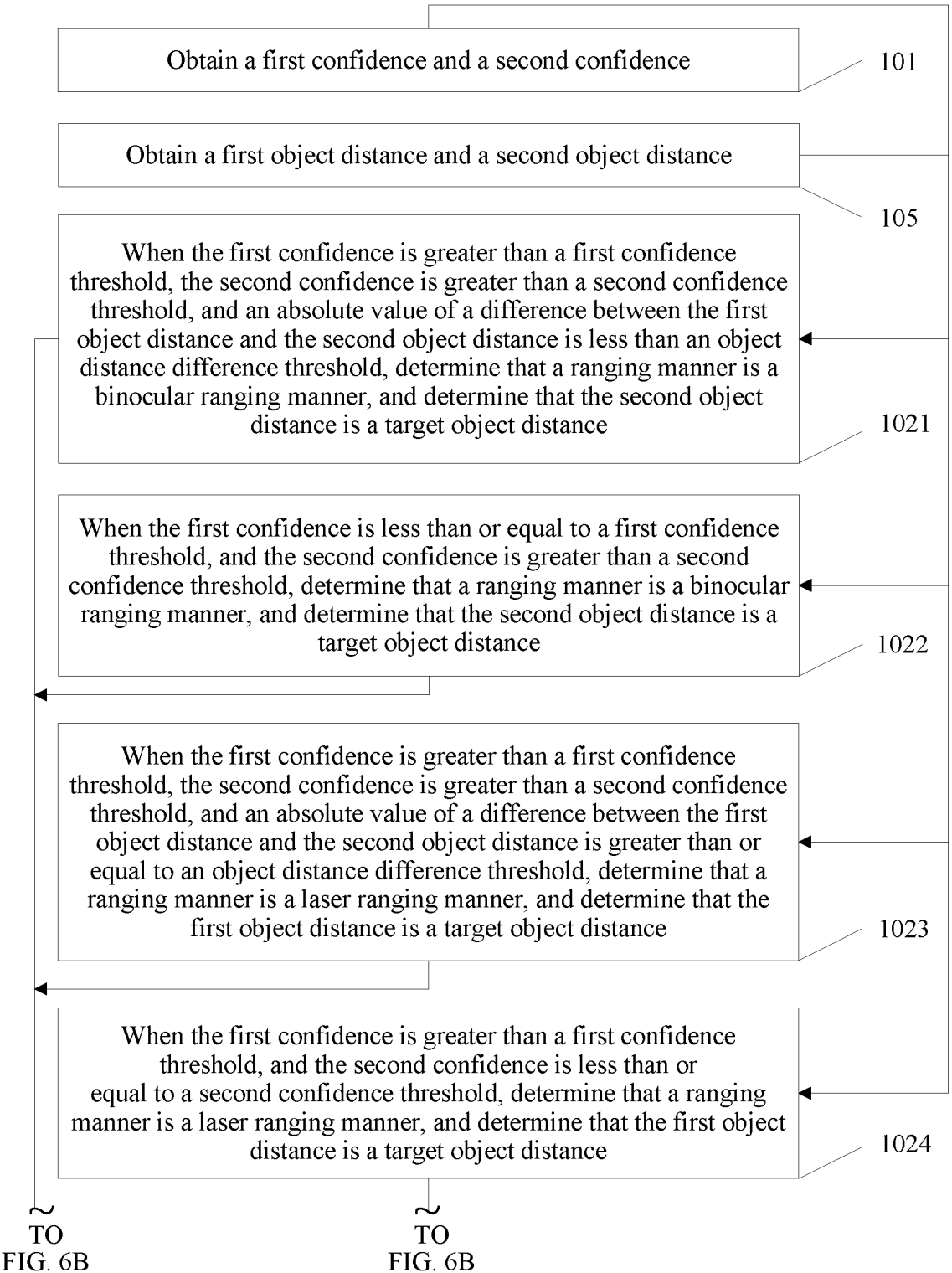
FIG. 6A and FIG. 6B are a flowchart of another camera focusing method for a terminal according to an embodiment of the present invention.
Figure 6B:
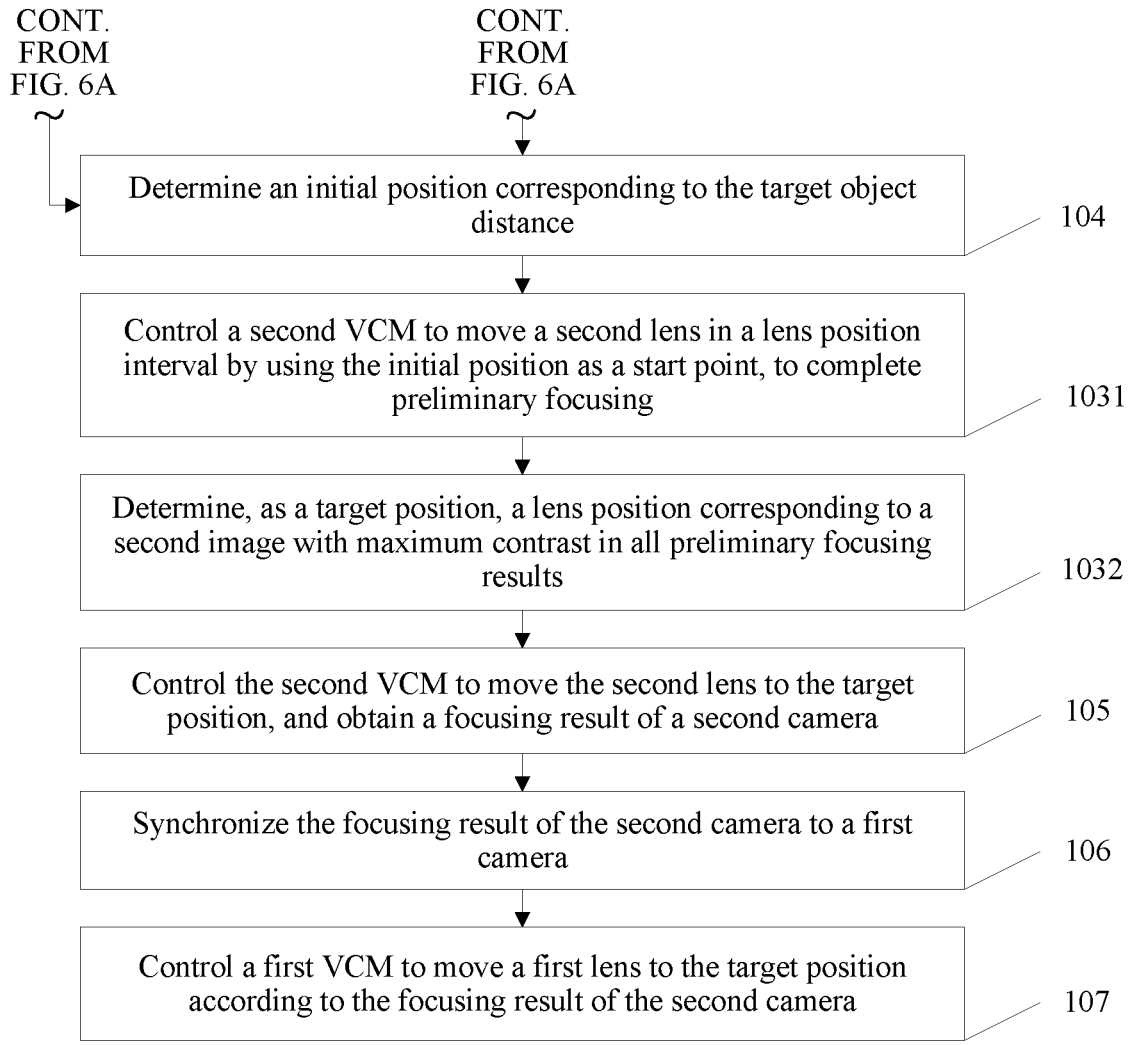

When the binocular ranging manner is used, a focusing process is completed by the second camera. Therefore, to ensure consistency between focusing information of the first camera and focusing information of the second camera, in an implementation of this embodiment of the present invention, the first camera includes a first VCM, and after the second camera completes focusing, a focusing result of the second camera may be synchronized to the first camera. Therefore, based on the implementation shown in FIG. 5A and FIG. 5B, an implementation shown in FIG. 6A and FIG. 6B may be further implemented. After step 1031 and step 1032 are performed, step 105 to step 107 may be performed.

105. Control the second VCM to move the second lens to the target position, and obtain a focusing result of the second camera.

106. Synchronize the focusing result of the second camera to the first camera.

107. Control the first VCM to move the first lens to the target position according to the focusing result of the second camera.

The first camera and the second camera have different image collection speeds, and the speed of collecting an image by the second camera is greater than the speed of collecting an image by the first camera. Therefore, a time of obtaining the focusing result by the second camera is earlier than a time of obtaining a focusing result by the first camera. In this embodiment of the present invention, to reduce the time of obtaining the focusing result by the first camera, and to ensure consistency between the focusing result of the first camera and the focusing result of the second camera, after the second camera completes focusing and obtains the focusing result, the focusing result may be synchronized to the first camera. Then, a lens position of the second lens is adjusted according to the focusing result, and a focusing process of two cameras is completed.

According to the camera focusing method for a terminal provided in this embodiment of the present invention, after the target position in all lens positions in the lens position interval is determined by using the improved hill climbing method, focusing of the second lens is completed by controlling the second VCM to move the second lens to the target position, and then the focusing result of the second lens is synchronized to the first lens, so that the first lens is moved to the target position, to complete a focusing process. In the prior art, an object distance of an image subject is calculated by means of binocular ranging, and then a VCM is controlled to enable a lens to reach a specified lens position to complete an active focusing process. By contrast, in the present invention, when the binocular ranging manner needs to be used to complete ranging, a focusing speed may be improved by using a characteristic in which an image collected by the first camera in two cameras is to be displayed and an image collected by the second camera is not to be displayed and by improving a speed of collecting an image by the second camera. In addition, after the second camera completes a focusing process, a focusing result of the second camera is synchronized to the first camera. Therefore, a focusing failure that is caused when an object in a focusing window has a relatively weak texture or an object in a focusing window has repeated patterns is avoided, and a focusing speed of completing focusing by two cameras is also improved by means of focusing result synchronization. That is, not only focusing precision of a terminal in a camera focusing process is improved, but also consistency between a focusing result of the first camera and the focusing result of the second camera is ensured by means of focusing result synchronization. The focusing speed of the two cameras is also improved.

Figure 7:
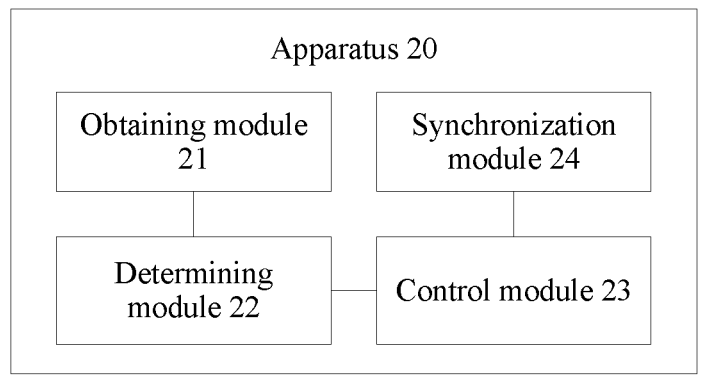
FIG. 7 is a schematic structural diagram of a camera focusing apparatus for a terminal according to an embodiment of the present invention.

An embodiment of the present invention provides a camera focusing apparatus 20 for a terminal, as shown in FIG. 7, configured to perform the method procedures shown in FIG. 2 to FIG. 6A and FIG. 6B. The terminal includes a laser sensor, a first camera, and a second camera. The first camera and the second camera are disposed side by side. The apparatus 20 includes:

an obtaining module 21, configured to obtain a first confidence and a second confidence, where the first confidence is a confidence of an object distance obtained by means of measurement in a laser ranging manner, the second confidence is a confidence of an object distance obtained by means of measurement in a binocular ranging manner, and a confidence is used to indicate accuracy of an object distance obtained by means of measurement in a ranging manner; and a determining module 22, configured to determine a target ranging manner and a target object distance when the first confidence and the second confidence that are obtained by the obtaining module 21 meet a preset condition, where the preset condition is that the first confidence is greater than a first confidence threshold, and/or the second confidence is greater than a second confidence threshold, and the target ranging manner is the laser ranging manner or the binocular ranging manner.

The determining module 22 is further configured to determine a target position in a lens position interval, so as to help the first camera and the second camera complete focusing.

In an implementation of this embodiment of the present invention, the obtaining module 21 is further configured to obtain a first object distance and a second object distance. The first object distance is the object distance obtained by means of measurement in the laser ranging manner, and the second object distance is the object distance obtained by means of measurement in the binocular ranging manner.

The determining module 22 is specifically configured to: when the first confidence obtained by the obtaining module 21 is greater than the first confidence threshold, the second confidence is greater than the second confidence threshold, and an absolute value of a difference between the first object distance and the second object distance is less than an object distance difference threshold, determine that the ranging manner is the binocular ranging manner, and determine that the second object distance is the target object distance; or when the first confidence is less than or equal to the first confidence threshold, and the second confidence is greater than the second confidence threshold, determine that the ranging manner is the binocular ranging manner, and determine that the second object distance is the target object distance; or when the first confidence is greater than the first confidence threshold, the second confidence is greater than the second confidence threshold, and an absolute value of a difference between the first object distance and the second object distance is greater than or equal to an object distance difference threshold, determine that the ranging manner is the laser ranging manner, and determine that the first object distance is the target object distance; or when the first confidence is greater than the first confidence threshold, and the second confidence is less than or equal to the second confidence threshold, determine that the ranging manner is the laser ranging manner, and determine that the first object distance is the target object distance.

It should be noted that the first camera collects a first image, and sends the first image to a display of the terminal to help a user preview the first image, a second image collected by the second camera is not used for user preview, and a speed of collecting the second image by the second camera is greater than a speed of collecting the first image by the first camera.

In an implementation of this embodiment of the present invention, the determining that the ranging manner is the binocular ranging manner, the determining module 22 is specifically configured to determine that the second object distance obtained by means of ranging according to the first image and the second image is the target object distance.

In an implementation of this embodiment of the present invention, the first camera includes a first lens, the second camera includes a second lens and a second voice coil motor VCM, and the determining module 22 is further configured to determine an initial position corresponding to the target object distance. The initial position is a position of the first lens and a position of the second lens that are determined according to the target object distance.

The determining module 22 is specifically configured to: control the second VCM to move the second lens in the lens position interval by using the initial position as a start point, to complete preliminary focusing; and determine, as the target position, a lens position corresponding to a second image with maximum contrast in all preliminary focusing results.

In an implementation of this embodiment of the present invention, the first camera includes a first VCM, and the apparatus includes:

a control module 23, configured to: control the second VCM to move the second lens to the target position, and obtain a focusing result of the second camera; and a synchronization module 24, configured to synchronize the focusing result of the second camera that is obtained by the control module 23 to the first camera.

The control module 23 is further configured to control the first VCM to move the first lens to the target position according to the focusing result of the second camera that is synchronized by the synchronization module 24.

The camera focusing apparatus for a terminal provided in this embodiment of the present invention separately obtains the confidences of the object distances obtained in the laser ranging manner and the binocular ranging manner, when at least one of the two confidences is greater than a confidence threshold corresponding to the confidence, determines the target ranging manner and the target object distance, and then determines the target position in the lens position interval, so as to help the first camera and the second camera complete focusing. A confidence is used to indicate accuracy of an object distance obtained by means of measurement in a ranging manner. In the prior art, an object distance of an image subject is calculated by means of binocular ranging, and then a VCM is controlled to enable a lens to reach a specified lens position to complete an active focusing process. By contrast, in the present invention, different ranging manners may be determined as a target ranging manner according to requirements in different application scenarios and a target object distance is also determined, and then in a lens position interval, a focusing process is completed around an in-focus point. That is, in the present invention, different ranging manners may be used for different cases, so as to effectively avoid a problem of a focusing failure that is caused when an object in a focusing window has a relatively weak texture or an object in a focusing window has repeated patterns. Therefore, a position of the in-focus point can be quickly and accurately determined, and further a focusing process of the first camera and the second camera is completed. In conclusion, focusing precision of a terminal in a camera focusing process can be improved in the present invention.

Figure 8:
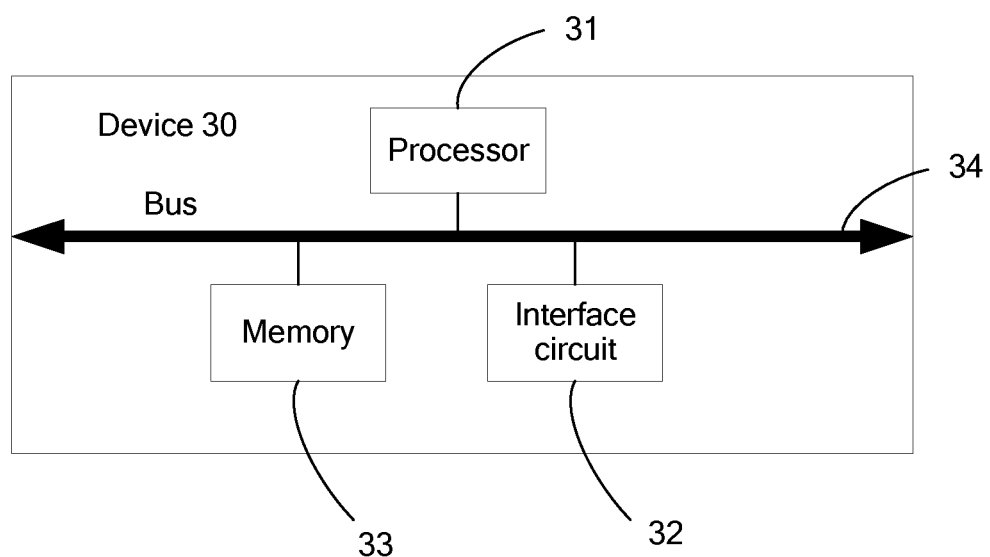
FIG. 8 is a schematic structural diagram of a camera focusing device for a terminal according to an embodiment of the present invention.

An embodiment of the present invention provides a camera focusing device 30 for a terminal, as shown in FIG. 8, configured to perform the method procedures shown in FIG. 2 to FIG. 6A and FIG. 6B. The terminal includes a laser sensor, a first camera, and a second camera. The first camera and the second camera are disposed side by side. The device 30 includes a processor 31 and an interface circuit 32. A memory 33 and a bus 34 are further shown in the figure. The processor 31, the interface circuit 32, and the memory 33 are connected to and communicate with each other by using the bus 34.

It should be noted that the processor 31 herein may be one processing element, or may be a general term of multiple processing elements. For example, the processing element may be a CPU, or may be an application-specific integrated circuit (Application Specific Integrated Circuit, ASIC for short), or may be one or more integrated circuits configured to implement this embodiment of the present invention, for example, one or more microprocessors (English: digital signal processor, DSP for short) or one or more field programmable gate arrays (English: Field Programmable Gate Array, FPGA for short).

The memory 33 may be one storage apparatus or may be a general term of multiple storage elements, and is configured to store executable program code or a parameter, data, and the like that are required for running an access network management device. In addition, the memory 33 may include a random access memory (RAM for short), and may further include a non-volatile memory (English: non-volatile memory), for example, a magnetic disk memory or a flash memory (English: Flash).

The bus 34 may be an industry standard architecture (English: Industry Standard Architecture, ISA for short) bus, a Peripheral Component Interconnect (English: Peripheral Component, PCI for short) bus, an extended industry standard architecture (English: Extended Industry Standard Architecture, EISA for short) bus, or the like. The bus 34 may be classified into an address bus, a data bus, a control bus, and the like. For ease of representation, only one bold line is used in FIG. 8 for representation, but it does not indicate that there is only one bus or one type of bus.

The device 30 may further include an input/output apparatus. The input/output apparatus is connected to the bus 34, so as to connect to other components such as the processor 31 by using the bus 34.

The processor 31 invokes the program code in the memory 33, so as to perform operations performed by the device 30 in the foregoing method embodiments. For example, the operations include the following:

The interface circuit 32 obtains a first confidence and a second confidence. The first confidence is a confidence of an object distance obtained by means of measurement in a laser ranging manner, the second confidence is a confidence of an object distance obtained by means of measurement in a binocular ranging manner, and a confidence is used to indicate accuracy of an object distance obtained by means of measurement in a ranging manner.

The processor 31 determines a target ranging manner and a target object distance when the first confidence and the second confidence that are obtained by the interface circuit 32 meet a preset condition. The preset condition is that the first confidence is greater than a first confidence threshold, and/or the second confidence is greater than a second confidence threshold, and the target ranging manner is the laser ranging manner or the binocular ranging manner.

The processor 31 determines a target position in a lens position interval, so as to help the first camera and the second camera complete focusing.

In an implementation of this embodiment of the present invention, before the target ranging manner and the target object distance are determined when the first confidence and the second confidence meet the preset condition, the interface circuit 32 obtains a first object distance and a second object distance. The first object distance is the object distance obtained by means of measurement in the laser ranging manner, and the second object distance is the object distance obtained by means of measurement in the binocular ranging manner.

When the first confidence obtained by the interface circuit 32 is greater than the first confidence threshold, the second confidence is greater than the second confidence threshold, and an absolute value of a difference between the first object distance and the second object distance is less than an object distance difference threshold, the processor 31 determines that the ranging manner is the binocular ranging manner, and determines that the second object distance is the target object distance; or when the first confidence is less than or equal to the first confidence threshold, and the second confidence is greater than the second confidence threshold, determines that the ranging manner is the binocular ranging manner, and determines that the second object distance is the target object distance; or when the first confidence is greater than the first confidence threshold, the second confidence is greater than the second confidence threshold, and an absolute value of a difference between the first object distance and the second object distance is greater than or equal to an object distance difference threshold, determines that the ranging manner is the laser ranging manner, and determines that the first object distance is the target object distance; or when the first confidence is greater than the first confidence threshold, and the second confidence is less than or equal to the second confidence threshold, determines that the ranging manner is the laser ranging manner, and determines that the first object distance is the target object distance.

It should be noted that the first camera collects a first image, and sends the first image to a display of the terminal to help a user preview the first image, a second image collected by the second camera is not used for user preview, and a speed of collecting the second image by the second camera is greater than a speed of collecting the first image by the first camera.

In an implementation of this embodiment of the present invention, the determining that the ranging manner is the binocular ranging manner, the processor 31 determines that the second object distance obtained by means of ranging according to the first image and the second image is the target object distance.

In an implementation of this embodiment of the present invention, the first camera includes a first lens, the second camera includes a second lens and a second voice coil motor VCM, and before the target position is determined in the lens position interval, the processor 31 determines an initial position corresponding to the target object distance. The initial position is a position of the first lens and a position of the second lens that are determined according to the target object distance.

The processor 31 controls the second VCM to move the second lens in the lens position interval by using the initial position as a start point, to complete preliminary focusing; and determines, as the target position, a lens position corresponding to a second image with maximum contrast in all preliminary focusing results.

In an implementation of this embodiment of the present invention, the first camera includes a first VCM, and after the target position is determined in the lens position interval, the processor 31 controls the second VCM to move the second lens to the target position, and obtains a focusing result of the second camera.

The interface circuit 32 synchronizes the focusing result of the second camera that is obtained by the processor 31 to the first camera.

The processor 31 controls the first VCM to move the first lens to the target position according to the focusing result of the second camera that is synchronized by the interface circuit 32.

The camera focusing device for a terminal provided in this embodiment of the present invention separately obtains the confidences of the object distances obtained in the laser ranging manner and the binocular ranging manner, when at least one of the two confidences is greater than a confidence threshold corresponding to the confidence, determines the target ranging manner and the target object distance, and then determines the target position in the lens position interval, so as to help the first camera and the second camera complete focusing. A confidence is used to indicate accuracy of an object distance obtained by means of measurement in a ranging manner. In the prior art, an object distance of an image subject is calculated by means of binocular ranging, and then a VCM is controlled to enable a lens to reach a specified lens position to complete an active focusing process. By contrast, in the present invention, different ranging manners may be determined as a target ranging manner according to requirements in different application scenarios and a target object distance is also determined, and then in a lens position interval, a focusing process is completed around an in-focus point. That is, in the present invention, different ranging manners may be used for different cases, so as to effectively avoid a problem of a focusing failure that is caused when an object in a focusing window has a relatively weak texture or an object in a focusing window has repeated patterns. Therefore, a position of the in-focus point can be quickly and accurately determined, and further a focusing process of the first camera and the second camera is completed. In conclusion, focusing precision of a terminal in a camera focusing process can be improved in the present invention.

Figure 9:
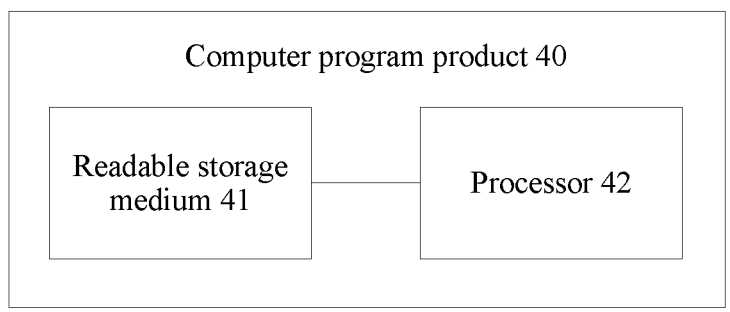
FIG. 9 is a schematic structural diagram of a computer program product according to an embodiment of the present invention.

An embodiment of the present invention provides a computer program product 40. As shown in FIG. 9, the computer program product 40 includes a readable storage medium 41, configured to store computer program code. The computer program code runs on a processor 42, and the computer program code is used to:

obtain a first confidence and a second confidence, where the first confidence is a confidence of an object distance obtained by means of measurement in a laser ranging manner, the second confidence is a confidence of an object distance obtained by means of measurement in a binocular ranging manner, and a confidence is used to indicate accuracy of an object distance obtained by means of measurement in a ranging manner;

determine a target ranging manner and a target object distance when the first confidence and the second confidence meet a preset condition, where the preset condition is that the first confidence is greater than a first confidence threshold, and/or the second confidence is greater than a second confidence threshold, and the target ranging manner is the laser ranging manner or the binocular ranging manner; and determine a target position in a lens position interval, so as to help a first camera and a second camera complete focusing, where the first camera and the second camera are disposed side by side on a terminal, and the terminal further includes a laser sensor.

In an implementation of this embodiment of the present invention, before the target ranging manner and the target object distance are determined when the first confidence and the second confidence meet the preset condition, the computer program code is further used to:

obtain a first object distance and a second object distance. The first object distance is the object distance obtained by means of measurement in the laser ranging manner, and the second object distance is the object distance obtained by means of measurement in the binocular ranging manner.

The computer program code is specifically used to:

when the first confidence is greater than the first confidence threshold, the second confidence is greater than the second confidence threshold, and an absolute value of a difference between the first object distance and the second object distance is less than an object distance difference threshold, determine that the ranging manner is the binocular ranging manner, and determine that the second object distance is the target object distance; or when the first confidence is less than or equal to the first confidence threshold, and the second confidence is greater than the second confidence threshold, determine that the ranging manner is the binocular ranging manner, and determine that the second object distance is the target object distance; or when the first confidence is greater than the first confidence threshold, the second confidence is greater than the second confidence threshold, and an absolute value of a difference between the first object distance and the second object distance is greater than or equal to an object distance difference threshold, determine that the ranging manner is the laser ranging manner, and determine that the first object distance is the target object distance; or when the first confidence is greater than the first confidence threshold, and the second confidence is less than or equal to the second confidence threshold, determine that the ranging manner is the laser ranging manner, and determine that the first object distance is the target object distance.

It should be noted that the first camera collects a first image, and sends the first image to a display of the terminal to help a user preview the first image, a second image collected by the second camera is not used for user preview, and a speed of collecting the second image by the second camera is greater than a speed of collecting the first image by the first camera.

In an implementation of this embodiment of the present invention, the determining that the ranging manner is the binocular ranging manner, the computer program code is specifically used to:

determine that the second object distance obtained by means of ranging according to the first image and the second image is the target object distance.

In an implementation of this embodiment of the present invention, the first camera includes a first lens, the second camera includes a second lens and a second voice coil motor VCM, and before the target position is determined in the lens position interval, the computer program code is further used to:

determine an initial position corresponding to the target object distance. The initial position is a position of the first lens and a position of the second lens that are determined according to the target object distance.

The computer program code is specifically used to:

control the second VCM to move the second lens in the lens position interval by using the initial position as a start point, to complete preliminary focusing; and determine, as the target position, a lens position corresponding to a second image with maximum contrast in all preliminary focusing results.

In an implementation of this embodiment of the present invention, the first camera includes a first VCM, and after the target position is determined in the lens position interval, the computer program code is further used to:

control the second VCM to move the second lens to the target position, and obtain a focusing result of the second camera;

synchronize the focusing result of the second camera to the first camera; and control the first VCM to move the first lens to the target position according to the focusing result of the second camera.

According to the computer program product provided in this embodiment of the present invention, the confidences of the object distances obtained in the laser ranging manner and the binocular ranging manner are separately obtained, when at least one of the two confidences is greater than a confidence threshold corresponding to the confidence, the target ranging manner and the target object distance are determined, and then the target position is determined in the lens position interval, so as to help the first camera and the second camera complete focusing. A confidence is used to indicate accuracy of an object distance obtained by means of measurement in a ranging manner. In the prior art, an object distance of an image subject is calculated by means of binocular ranging, and then a VCM is controlled to enable a lens to reach a specified lens position to complete an active focusing process. By contrast, in the present invention, different ranging manners may be determined as a target ranging manner according to requirements in different application scenarios and a target object distance is also determined, and then in a lens position interval, a focusing process is completed around an in-focus point. That is, in the present invention, different ranging manners may be used for different cases, so as to effectively avoid a problem of a focusing failure that is caused when an object in a focusing window has a relatively weak texture or an object in a focusing window has repeated patterns. Therefore, a position of the in-focus point can be quickly and accurately determined, and further a focusing process of the first camera and the second camera is completed. In conclusion, focusing precision of a terminal in a camera focusing process can be improved in the present invention.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or some of the functions described above. For a detailed working process of the foregoing apparatus, refer to a corresponding process in the foregoing method embodiments, and details are not described herein again.

In the several embodiments provided in this application, it should be understood that the disclosed apparatus and method may be implemented in other manners. For example, the described apparatus embodiment is merely an example. For example, the module division is merely logical function division and may be other division in actual implementation. For example, multiple modules or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or modules may be implemented in electronic, mechanical, or other forms.

The modules described as separate parts may or may not be physically separate, and parts displayed as modules may be one or more physical modules, may be located in one place, or may be distributed on different places. Some or all the modules may be selected according to actual needs to achieve the objectives of the solutions of the embodiments.

In addition, functional modules in the embodiments of the present invention may be integrated into one processing module, or each of the modules may exist alone physically, or two or more modules are integrated into one module. The integrated module may be implemented in a form of hardware, or may be implemented in a form of a software functional module.

When the integrated module is implemented in the form of a software functional module and sold or used as an independent product, the integrated module may be stored in a readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a device (which may be a single-chip microcomputer, a chip, or the like) or a processor (processor) to perform all or some of the steps of the methods described in the embodiments of the present invention. The foregoing storage medium includes: any medium that can store program code, such as a USB flash drive, a removable hard disk, a read-only memory (English: Read-Only Memory, ROM for short), a random access memory (RAM for short), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A camera focusing method for a terminal, comprising:
   obtaining a first confidence and a second confidence, the first confidence comprising a confidence of an object distance obtained by measurement in a laser ranging manner, the second confidence comprising a confidence of an object distance obtained by measurement in a binocular ranging manner, a confidence indicating accuracy of an object distance obtained by measurement in a ranging manner, the terminal comprising a laser sensor, a first camera, and a second camera, and the first camera and the second camera being disposed side by side;
   determining a target ranging manner and a target object distance when the first confidence and the second confidence meet a preset condition, the preset condition comprising that the first confidence is greater than a first confidence threshold or the second confidence is greater than a second confidence threshold, and the target ranging manner comprising the laser ranging manner or the binocular ranging manner;
   determining a target position in a lens position interval; and
   assisting the first camera and the second camera to complete focusing based on the target position in the lens position interval.

2. The method of claim 1, wherein before determining the target ranging manner and the target object distance, the method further comprises obtaining a first object distance and a second object distance, the first object distance comprising the object distance obtained by measurement in the laser ranging manner, the second object distance comprising the object distance obtained by measurement in the binocular ranging manner, and determining the target ranging manner and the target object distance comprising:
   determining that the ranging manner comprises the binocular ranging manner and the second object distance comprises the target object distance when the first confidence is greater than the first confidence threshold, the second confidence is greater than the second confidence threshold, and an absolute value of a difference between the first object distance and the second object distance is less than an object distance difference threshold;
   determining that the ranging manner comprises the binocular ranging manner and the second object distance comprises the target object distance when the first confidence is less than or equal to the first confidence threshold, and the second confidence is greater than the second confidence threshold;
   determining that the ranging manner comprises the laser ranging manner and the first object distance comprises the target object distance when the first confidence is greater than the first confidence threshold, the second confidence is greater than the second confidence threshold, and the absolute value of the difference between the first object distance and the second object distance is greater than or equal to the object distance difference threshold; and
   determining that the ranging manner comprises the laser ranging manner and the first object distance comprises the tar object distance when the first confidence is greater than the first confidence threshold, and the second confidence is less than or equal to the second confidence threshold.

3. The method of claim 2, wherein the first camera is configured to collect a first image, and send the first image to a display of the terminal to help a user preview the first image, the second camera being configured to collect a second image not used for the user preview, and a speed of collecting the second image by the second camera being greater than a speed of collecting the first image by the first camera.

4. The method of claim 3, wherein determining that the ranging manner comprises the binocular ranging manner and the second object distance comprises the target object distance comprises determining that the second object distance obtained by ranging according to the first image and the second image comprises the target object distance.

5. The method of claim 3, wherein the first camera comprises a first lens, the second camera comprising a second lens and a second voice coil motor (VCM) before determining the target position in the lens position interval, the method further comprising determining an initial position corresponding to the target object distance, the initial position comprising a position of the first lens and a position of the second lens determined according to the target object distance, determining the target position in the lens position interval comprising:
controlling the second VCM to move the second lens in the lens position interval using the initial position as a start point to complete preliminary focusing; and
determining, as the target position, a lens position corresponding to the second image with maximum contrast in all preliminary focusing results.

6. The method of claim 5, wherein the first camera comprises a first VCM, and after determining the target position in the lens position interval, the method further comprising:
controlling the second VCM to move the second lens to the target position;
obtaining a focusing result of the second camera;
synchronizing the focusing result of the second camera to the first camera; and
controlling the first VCM to move the first lens to the target position according to the focusing result of the second camera.

7. A camera focusing device for a terminal, comprising:
an interface circuit configured to obtain a first confidence and a second confidence, the first confidence comprising a confidence of an object distance obtained by measurement in a laser ranging manner, the second confidence comprising a confidence of an object distance obtained by measurement in a binocular ranging manner, a confidence indicating accuracy of an object distance obtained by measurement in a ranging manner the terminal comprising laser sensor, a first camera, and a second camera, and the first camera and the second camera being disposed side by side; and
a processor coupled to the interface circuit and configured to:
determine a target ranging manner and a target object distance when the first confidence and the second confidence obtained by the interface circuit meet a preset condition, the preset condition comprising that the first confidence is greater than a first confidence threshold or the second confidence is greater than a second confidence threshold, and the target ranging manner comprising the laser ranging manner or the binocular ranging manner;
determine a target position in a lens position interval; and
assist the first camera and the second camera to complete focusing based on the target position in the lens position interval.

8. The device of claim 7, wherein before determining the target ranging manner and the target object distance, the interface circuit is further configured to obtain a first object distance and a second object distance, the first object distance is comprising the object distance obtained by measurement in the laser ranging manner, the second object distance is comprising the object distance obtained by measurement in the binocular ranging manner, and the processor being further configured to:
determine that the ranging manner comprises the binocular ranging manner and the second object distance comprises the target object distance when the first confidence obtained by the interface circuit is greater than the first confidence threshold, the second confidence is greater than the second confidence threshold, and an absolute value of a difference between the first object distance and the second object distance is less than an object distance difference threshold;
determine that the ranging manner comprises the binocular ranging manner and the second object distance comprises the target object distance when the first confidence is less than or equal to the first confidence threshold, and the second confidence is greater than the second confidence threshold;
determine that the ranging manner comprises the laser ranging manner and the first object distance comprises the target object distance when the first confidence is greater than the first confidence threshold, the second confidence is greater than the second confidence threshold, and the absolute value of the difference between the first object distance and the second object distance is greater than or equal to the object distance difference threshold; and
determine that the ranging manner comprises the laser ranging manner and the first object distance comprises the target object distance when the first confidence is greater than the first confidence threshold, and the second confidence is less than or equal to the second confidence threshold.

9. The device of claim 8, wherein the first camera is configured to collect a first image, and send the first image to a display of the terminal to help a user preview the first image, the second camera being configured to collect a second image not used for the user preview, and a speed of collecting the second image by the second camera being greater than a speed of collecting the first image by the first camera.

10. The device of claim 9, wherein in a manner of determining that the ranging manner comprises the binocular ranging manner, the processor is further configured to determine that the second object distance obtained by ranging according to the first image and the second image comprises the target object distance.

11. The device of claim 9, wherein the first camera comprises a first lens, the second camera comprising a second lens and a second voice coil motor (VCM), and before determining the target position in the lens position interval, the processor being further configured to:
determine an initial position corresponding to the target object distance, the initial position a position of the first lens and a position of the second lens determined according to the target object distance;
control the second VCM to move the second lens in the lens position interval by using the initial position as a start point to complete preliminary focusing; and
determine, as the target position, a lens position corresponding to the second image with maximum contrast in all preliminary focusing results.

12. The device of claim 11, wherein the first camera comprises a first VCM, and after determining the target position in the lens position interval, the processor being further configured to:
control the second VCM to move the second lens to the target position; and
obtain a focusing result of the second camera, the interface circuit being further configured to synchronize the focusing result of the second camera that-is-obtained by the processor to the first camera; and the processor being further configured to control the first VCM to move the first lens to the target position according to the focusing result of the second camera synchronized by the interface circuit.

13. A computer program product comprising a readable storage medium configured to store a computer program code, the computer program code running on a processor, and the computer program code causing the processor to be configured to:

obtain a first confidence and a second confidence, the first confidence comprising a confidence of an object distance obtained by measurement in a laser ranging manner, the second confidence comprising a confidence of an object distance obtained by measurement in a binocular ranging manner, and a confidence indicating accuracy of an object distance obtained by measurement in a ranging manner;

determine a target ranging manner and a target object distance when the first confidence and the second confidence meet a preset condition, the preset condition comprises that the first confidence is greater than a first confidence threshold or the second confidence is greater than a second confidence threshold, and the target ranging manner comprising the laser ranging manner or the binocular ranging manner;

determine a target position in a lens position interval; and assist a first camera and a second camera to complete focusing based on the target position in the lens position interval, the first camera and the second camera being disposed side by side on a terminal, and the terminal further comprising a laser sensor.

14. The computer program product of claim 13, wherein before determining the target ranging manner and the target object distance, the computer program code further causes the processor to be configured to obtain a first object distance and a second object distance, the first object distance comprising the object distance obtained by measurement in the laser ranging manner, the second object distance comprising the object distance obtained by measurement in the binocular ranging manner, and the computer program code being further causing the processor to be configured to:

determine that the ranging manner comprises the binocular ranging manner and the second object distance comprises the target object distance when the first confidence is greater than the first confidence threshold, the second confidence is greater than the second confidence threshold, and an absolute value of a difference between the first object distance and the second object distance is less than an object distance difference threshold;

determine that the ranging manner comprises the binocular ranging manner and the second object distance comprises the target object distance when the first confidence is less than or equal to the first confidence threshold, and the second confidence is greater than the second confidence threshold;

determine that the ranging manner comprises the laser ranging manner and the first object distance comprises the target object distance when the first confidence is greater than the first confidence threshold, the second confidence is greater than the second confidence threshold, and the absolute value of the difference between the first object distance and the second object distance is greater than or equal to the object distance difference threshold; and determine that the ranging manner comprises the laser ranging manner and the first object distance comprises the target object distance when the first confidence is greater than the first confidence threshold, and the second confidence is less than or equal to the second confidence threshold.

15. The computer program product of claim 14, wherein the first camera is configured to collect a first image, and send the first image to a display of the terminal to help a user preview the first image, the second camera being configured to collect a second image not used for the user preview, and a speed of collecting the second image by the second camera being greater than a speed of collecting the first image by the first camera.

16. The computer program product of claim 15, wherein in a manner of determining that the ranging manner comprises the binocular ranging manner, the computer program code is further causes the processor to be configured to determine that the second object distance obtained by ranging according to the first image and the second image is the target object distance.

17. The computer program product of claim 15, wherein the first camera comprises a first lens, the second camera comprising a second lens and a second voice coil motor (VCM), before determining the target position in the lens position interval, the computer program code being further causing the processor to be configured to determine an initial position corresponding to the target object distance, the initial position comprising a position of the first lens and a position of the second lens determined according to the target object distance, and the computer program code being further causing the processor to be configured to:

control the second VCM to move the second lens in the lens position interval using the initial position as a start point to complete preliminary focusing; and determine, as the target position, a lens position corresponding to the second image with maximum contrast in all preliminary focusing results.

18. The computer program product of claim 17, wherein the first camera comprises a first VCM, and after determining the target position in the lens position interval, the computer program code further causing the processor to be configured to:

control the second VCM to move the second lens to the target position;

obtain a focusing result of the second camera;

synchronize the focusing result of the second camera to the first camera; and control the first VCM to move the first lens to the target position according to the focusing result of the second camera.

* * * * *

UNITED STATES PATENT AND TRADEMARK OFFICE
CERTIFICATE OF CORRECTION

PATENT NO. : 10,630,884 B2
APPLICATION NO. : 16/087926
DATED : April 21, 2020
INVENTOR(S) : Cheng Du et al.

Page 1 of 1

It is certified that error appears in the above-identified patent and that said Letters Patent is hereby corrected as shown below:

In the Claims

Claim 2, Column 30, Line 52: "the tar object" should read "the target object"

Claim 5, Column 31, Line 11: "distance, determining" should read "distance, and determining"

Claim 8, Column 31, Line 63: "is comprising the object" should read "comprising the object"

Claim 8, Column 31, Line 65: "is comprising the object" should read "comprising the object"

Claim 11, Column 32, Line 52: "position a position" should read "position comprising a position"

Claim 12, Column 33, Line 2: "camera that-is-" should read "camera"

Signed and Sealed this
Sixteenth Day of June, 2020

Andrei Iancu
*Director of the United States Patent and Trademark Office*